United States Patent
Wang et al.

(10) Patent No.: US 12,143,983 B2
(45) Date of Patent: Nov. 12, 2024

(54) SCHEDULING METHOD AND APPARATUS

(71) Applicant: HUAWEI TECHNOLOGIES CO., LTD., Guangdong (CN)

(72) Inventors: Jian Wang, Hangzhou (CN); Chen Xu, Hangzhou (CN); Yourui HuangFu, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 17/826,522

(22) Filed: May 27, 2022

(65) Prior Publication Data

US 2022/0369332 A1   Nov. 17, 2022

Related U.S. Application Data

(63) Continuation of application No. PCT/CN2020/125882, filed on Nov. 2, 2020.

(30) Foreign Application Priority Data

Nov. 29, 2019   (CN) .......................... 201911205612.3

(51) Int. Cl.
*H04W 72/1263*   (2023.01)
*H04W 72/54*   (2023.01)

(52) U.S. Cl.
CPC ....... *H04W 72/1263* (2013.01); *H04W 72/54* (2023.01)

(58) Field of Classification Search
CPC . H04W 72/1263; H04W 72/54; H04W 72/12; H04W 72/535; G06N 3/045; G06N 3/08
See application file for complete search history.

(56) References Cited

U.S. PATENT DOCUMENTS

2018/0375957 A1   12/2018   Lv et al.
2019/0124667 A1    4/2019   Comsa et al.
(Continued)

FOREIGN PATENT DOCUMENTS

CN   103412795 A   11/2013
CN   104980934 A   10/2015
(Continued)

OTHER PUBLICATIONS

Wei Cui et al., Spatial Deep Learning for Wireless Scheduling, IEEE, Dec. 16, 2018, 15 pages.
(Continued)

*Primary Examiner* — Tejis Daya
(74) *Attorney, Agent, or Firm* — HUAWEI TECHNOLOGIES CO., LTD.

(57) ABSTRACT

This application provides a scheduling method and apparatus. The method includes: a network device uses a scheduling model applicable to K users for one or more times, and determines a scheduled terminal device based on scheduling weights output by the scheduling model for one or more times. Each time the scheduling model is used, status information of K terminal devices in n to-be-scheduled terminal devices is input to the scheduling model, and the scheduling model outputs scheduling weights respectively corresponding to the K terminal devices, where K is an integer greater than 1, and n is an integer greater than K. Therefore, regardless of a quantity of to-be-scheduled terminal devices in a communication system, the network device may reuse the scheduling model without re-establishing a scheduling model, so that the scheduling model is expandable and applicable to scenarios in which quantities of to-be-scheduled terminal devices are different.

17 Claims, 13 Drawing Sheets

(56) References Cited

U.S. PATENT DOCUMENTS

| | | | |
|---|---|---|---|
| 2019/0340492 A1 | 11/2019 | Burger et al. | |
| 2020/0229206 A1* | 7/2020 | Badic | H04W 28/0226 |
| 2020/0367264 A1* | 11/2020 | Chen | H04W 72/23 |
| 2021/0410161 A1* | 12/2021 | Wang | G06N 3/08 |
| 2023/0072585 A1* | 3/2023 | Han | G06N 20/00 |

FOREIGN PATENT DOCUMENTS

| | | |
|---|---|---|
| CN | 106973413 A | 7/2017 |
| CN | 107360202 A | 11/2017 |
| CN | 109799977 A | 5/2019 |
| CN | 109978129 A | 7/2019 |
| CN | 110011863 A | 7/2019 |
| EP | 3930278 A1 | 12/2021 |
| JP | H05284089 A | 10/1993 |
| JP | 2017200172 A | 11/2017 |
| WO | 2014061534 A1 | 4/2014 |
| WO | 2017024583 A1 | 2/2017 |
| WO | 2018126776 A1 | 7/2018 |
| WO | 2018149898 A2 | 8/2018 |

OTHER PUBLICATIONS

Ning Yang et al., Deep Neural Network for Resource Management in Noma Networks, IEEE, Jan. 2020, 11 pages.

Mugdim Bublin et al., A Self-Adaptive, Utility-based Scheduling for Wireless Cellular Networks, IEEE, Jul. 1-5, 2007, 5 pages.

* cited by examiner

SCHEDULING METHOD AND APPARATUS

CROSS-REFERENCE TO RELATED APPLICATIONS

This application is a continuation of International Application No. PCT/CN2020/125882, filed on Nov. 2, 2020, which claims priority to Chinese Patent Application No. 201911205612.3, filed on Nov. 29, 2019. The disclosures of the aforementioned applications are hereby incorporated by reference in their entireties.

TECHNICAL FIELD

The present invention relates to the field of communications technologies, and in particular, to a scheduling method and apparatus.

BACKGROUND

In a cellular network, media access control (media access control, MAC) layer scheduling mainly resolves problems such as time-frequency resource allocation, modulation and coding scheme (modulation and coding scheme, MCS) selection, user pairing, and precoding. A tradeoff between a system throughput and fairness is achieved through scheduling.

In an existing MAC layer scheduling algorithm, a communication system is usually modeled as a determined model, and a scheduling scheme is obtained through derivation of a formula. Resource block group (resource block group, RBG) allocation in the cellular network is used as an example. Common scheduling algorithms include a round robin (round robin, RR) algorithm, a maximum carrier-to-interference ratio (maximum carrier-to-interference ratio, Max C/I) algorithm, a proportional fair (proportional fair, PF) algorithm, and the like.

Due to complexity of the communication system, it is impossible to accurately model the communication system by using a closed-form model and formula. Therefore, a formula-based scheduling algorithm such as the PF algorithm cannot ensure optimal performance of the communication system.

SUMMARY

This application provides a scheduling method and apparatus, to optimize a MAC scheduling algorithm.

According to a first aspect, an embodiment of this application provides a scheduling method. The method may be applied to a network device, or a chip or a chip set in a network device. The method includes: using a scheduling model for M times, where each time the scheduling model is used, status information of K terminal devices in n to-be-scheduled terminal devices is input to the scheduling model, the scheduling model outputs scheduling weights respectively corresponding to the K terminal devices, the scheduling model is a neural network model obtained based on a quantity K of terminal devices that is input each time, M is an integer greater than or equal to 1, K is an integer greater than 1, and n is an integer greater than K; and determining a decision result based on M outputs of the scheduling model, where the decision result indicates a scheduled terminal device.

A neural network model applicable to K users is established in embodiments of this application. It may be understood that the neural network model includes a parameter set applicable to the K terminal devices, and to-be-scheduled terminal devices in a communication system may share the parameter set. In other words, the neural network model may be used for a plurality of times during scheduling decision. The network device may determine, by using the parameter set, scheduling weights corresponding to a group of to-be-scheduled terminal devices in the communication system group by group, where each group includes K to-be-scheduled terminal devices. Therefore, regardless of a quantity of to-be-scheduled terminal devices in the communication system, the network device may reuse the neural network model without re-establishing a neural network model, so that the neural network model is expandable and applicable to scenarios in which quantities of to-be-scheduled terminal devices are different.

In a possible design, the determining a decision result based on M outputs of the scheduling model may include: using a decision module for M times, where when the decision module is used for an $i^{th}$ time, a scheduling weight that is output when the scheduling model is used for an $i^{th}$ time is input to the decision module, the decision module outputs a scheduled terminal device in the K terminal devices that is input when the scheduling model is used for the $i^{th}$ time, i={1, 2, 3, . . . , M}, and the decision module is configured to determine the scheduled terminal device based on the scheduling weight of the terminal device; determining L to-be-scheduled terminal devices based on the scheduled terminal device in the K terminal devices that is input each time the scheduling model is used, where L is a positive integer; if L is less than or equal to K, inputting status information of the L to-be-scheduled terminal devices to the scheduling model, to obtain scheduling weights respectively corresponding to the L to-be-scheduled terminal devices; and inputting the scheduling weights corresponding to the L to-be-scheduled terminal devices to the decision module, to obtain the decision result.

The scheduling weights of the K terminal devices that simultaneously use the scheduling model are determined based on a same reference, but scheduling weights of terminal devices that use the scheduling model in different times are not determined based on a same reference. In the foregoing design, the scheduling weights are re-determined by using the scheduling model after the terminal devices determined based on the M outputs are further grouped, so that the scheduling weights of the terminal devices determined based on the M outputs may be determined based on a same reference. This can improve accuracy of a decision result, and further improve gains of MAC scheduling.

In a possible design, determining a first scheduling decision based on the M outputs of the scheduling model may include: using a decision module for M times, where when the decision module is used for an $i^{th}$ time, an $i^{th}$ output is input to the decision module, the decision module outputs a second scheduling decision corresponding to the $i^{th}$ output, the second scheduling decision indicates a scheduled terminal device in the K terminal devices that is input when the scheduling model is used for the $i^{th}$ time, i={1, 2, 3, . . . , M}, and the decision module is configured to determine the scheduled terminal device based on a scheduling weight of the terminal device. A plurality of to-be-scheduled terminal devices are determined based on second scheduling decisions respectively corresponding to the M outputs. If a quantity of determined terminal devices is greater than K, the following process may be repeatedly performed until the quantity of determined terminal devices is less than or equal to K: using the scheduling model for at least one time; inputting at least one output to the decision module one by one, to obtain a second decision result of the at least one output; and determining a plurality of terminal devices based on the second decision result of the at least one output. When the quantity of determined terminal devices is less than or equal to K, status information of the determined terminal devices is input to the scheduling model, to obtain scheduling weights respectively corresponding to the determined terminal devices. The scheduling weights respectively corresponding to the determined terminal devices are input to the decision module, to obtain the first scheduling decision.

The scheduling weights of the K terminal devices that simultaneously use the scheduling model are determined based on a same reference, but scheduling weights of terminal devices that use the scheduling model in different times are not determined based on a same reference. In the foregoing design, the scheduling weights are re-determined by using the scheduling model after the terminal devices determined based on the result output by the scheduling model are further grouped, so that the scheduling weights of the to-be-scheduled terminal devices may be determined based on a same reference. This can improve accuracy of a decision result, and further improve gains of MAC scheduling.

In a possible design, when the status information of the K terminal devices in the n to-be-scheduled terminal devices is input to the scheduling model, and the scheduling model outputs the scheduling weights respectively corresponding to the K terminal devices, the status information of the K terminal devices in the n to-be-scheduled terminal devices may be input to an input layer of the scheduling model for dimension conversion. The status information of the K terminal devices on which dimension conversion is performed is input to a hidden layer of the scheduling model for feature extraction, where the scheduling model includes one or more hidden layers. A feature extracted by the hidden layer is input to an output layer of the scheduling model, to obtain the scheduling weights respectively corresponding to the K terminal devices. In the foregoing design, the status information of the terminal devices is determined by using a fully-connected neural network, to obtain a better scheduling decision.

In a possible design, a size of the input layer is K×M, and M is a quantity of performance parameters included in the status information.

In a possible design, a quantity of neurons at an $l^{th}$ hidden layer of the scheduling model is K×M×$a_l$, M is the quantity of performance parameters included in the status information, and $a_l$ is a positive integer.

In a possible design, K is a possible minimum quantity of active users in a network. In the foregoing design, a scale of the established neural network (namely, a depth of the neural network and a quantity of neurons at each layer) is small. This can improve training efficiency, and save computing resources.

In a possible design, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

According to a second aspect, an embodiment of this application provides a scheduling method. The method may be applied to a network device, or a chip or a chip set in a network device. The method includes: selecting K to-be-scheduled terminal devices from n to-be-scheduled terminal devices, where K is an integer greater than 1, and n is an integer greater than or equal to K; inputting status information of the K to-be-scheduled terminal devices to a scheduling model, to obtain scheduling weights respectively corresponding to the K to-be-scheduled terminal devices, where the scheduling model is a neural network model obtained based on the quantity K of selected terminal devices; and determining a decision result based on the scheduling weights respectively corresponding to the K to-be-scheduled terminal devices, where the decision result indicates a scheduled terminal device.

A neural network model applicable to K users is established in embodiments of this application. It may be understood that the neural network model includes a parameter set applicable to the K terminal devices, and to-be-scheduled terminal devices are selected, so that the neural network model is applicable to a scenario in which a quantity of to-be-scheduled terminal devices is greater than K, and does not need to be re-trained. Therefore, the neural network model is expandable and applicable to scenarios in which quantities of to-be-scheduled terminal devices are different.

In a possible design, when the K to-be-scheduled terminal devices are selected from the n to-be-scheduled terminal devices, then to-be-scheduled terminal devices may be sorted based on at least one performance parameter in the status information. The K to-be-scheduled terminal devices are determined based on the sorted n to-be-scheduled terminal devices. In the foregoing design, the K preferred terminal devices may first be selected, so that the scheduling weights corresponding to the K preferred terminal devices may be determined by using the scheduling model. This is applicable to scenarios in which quantities of to-be-scheduled terminal devices are different, and can improve gains of MAC scheduling.

In a possible design, the inputting status information of the K to-be-scheduled terminal devices to a scheduling model may include: inputting the status information of the K to-be-scheduled terminal devices to an input layer of the scheduling model for dimension conversion; inputting the status information of the K to-be-scheduled terminal devices on which dimension conversion is performed to a hidden layer of the scheduling model for feature extraction, where the scheduling model includes one or more hidden layers; and inputting a feature extracted by the hidden layer to an output layer of the scheduling model, to obtain the scheduling weights respectively corresponding to the K to-be-scheduled terminal devices. In the foregoing design, the status information of the terminal devices is determined by using a fully-connected neural network, to obtain a better scheduling decision.

In a possible design, a size of the input layer is K×M, and M is a quantity of performance parameters included in the status information.

In a possible design, a quantity of neurons at an $l^{th}$ hidden layer of the scheduling model is K×M×$a_l$, M is the quantity of performance parameters included in the status information, and $a_l$ is a positive integer.

In a possible design, K is a possible minimum quantity of active users in a network. In the foregoing design, a scale of the established neural network (namely, a depth of the neural network and a quantity of neurons at each layer) is small. This can improve training efficiency, and save computing resources.

In a possible design, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

According to a third aspect, an embodiment of this application provides a scheduling method. The method may be applied to a network device, or a chip or a chip set in a network device. The method includes: inputting status information of n to-be-scheduled terminal devices to a first module of a scheduling model for association, to obtain first data respectively corresponding to the n to-be-scheduled terminal devices, where the first data is data obtained after the status information of the terminal devices corresponding to the first data is associated with status information of another terminal device, and n is an integer greater than or equal to 1; using a second module of the scheduling model for n times, where each time the second module is used, first data corresponding to one of the n to-be-scheduled terminal devices is input to the second module, the second module outputs a scheduling weight of the terminal device, and the second module is configured to determine the scheduling weight; and determining a decision result based on scheduling weights of the n to-be-scheduled terminal devices, where the decision result indicates a scheduled terminal device.

A plurality of users share a parameter of a module other than the first module in the scheduling model in embodiments of this application, so that a scale of the scheduling model (namely, a depth of a neural network and a quantity of neurons at each layer) is small. This can save resources and improve scheduling efficiency. In addition, the users share a parameter of a module other than the first module in the scheduling model, so that when the scheduling model is expandable and applicable to scenarios in which quantities of to-be-scheduled terminal devices are different, the neural network does not need to be retrained.

In a possible design, the second module may be a neural network obtained based on one terminal device, to determine the scheduling weight. In the foregoing design, the second module is obtained (or established) based on one terminal device, and includes a parameter set applicable to one terminal device. To-be-scheduled terminal devices in a communication system may share the parameter set. The network device may determine, by using the parameter set, scheduling weights corresponding to the to-be-scheduled terminal devices in the communication system one by one. Therefore, regardless of a quantity of to-be-scheduled terminal devices in the communication system, the network device may reuse the second module without re-establishing a neural network.

In a possible design, the scheduling model may further include a third module, and the third module is configured to perform feature extraction. Before the inputting status information of n to-be-scheduled terminal devices to a first module of the scheduling model for association, the method further includes: using the third module for n times, where each time the third module is used, status information of one of the n to-be-scheduled terminal devices is input to the third module, and the third module outputs second data of the terminal device; and the inputting status information of n to-be-scheduled terminal devices to a first module of a scheduling model for association includes: inputting second data of the n to-be-scheduled terminal devices to the first module for association. In the foregoing design, before the status information of the to-be-scheduled terminal device is associated, feature extraction is performed, to obtain a better scheduling decision.

In a possible design, the third module may be a neural network obtained based on one terminal device, to perform feature extraction. In the foregoing design, the third module is obtained (or established) based on one terminal device, and includes a parameter set applicable to one terminal device. To-be-scheduled terminal devices in a communication system may share the parameter set. The network device may perform, by using the parameter set, feature extraction on the to-be-scheduled terminal devices in the communication system one by one. Therefore, regardless of a quantity of to-be-scheduled terminal devices in the communication system, the network device may reuse the third module without re-establishing a neural network.

In a possible design, the scheduling model further includes a fourth module, and the fourth module is configured to perform dimension increasing. Before the using the third module for n times, the method further includes: using the fourth module for n times, where each time the fourth module is used, status information of one of the n to-be-scheduled terminal devices is input to the fourth module, and the fourth module outputs status information of the terminal device obtained through dimension increasing; and that status information of one of then to-be-scheduled terminal devices is input to the third module includes: inputting status information of one of the n to-be-scheduled terminal devices obtained through dimension increasing to the third module.

In a possible design, the fourth module may be a neural network obtained based on one terminal device, to perform feature extraction. In the foregoing design, the fourth module is obtained (or established) based on one terminal device, and includes a parameter set applicable to one terminal device. To-be-scheduled terminal devices in a communication system may share the parameter set. The network device may perform, by using the parameter set, dimension increasing on the to-be-scheduled terminal devices in the communication system one by one. Therefore, regardless of a quantity of to-be-scheduled terminal devices in the communication system, the network device may reuse the fourth module without re-establishing a neural network.

In a possible design, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

According to a fourth aspect, this application provides a scheduling apparatus. The apparatus may be a network device, or a chip or a chip set in a network device. The apparatus may include a processing unit, and may further include a communication unit. When the apparatus is a network device, the processing unit may be a processor, and the communication unit may be a transceiver. The apparatus may further include a storage module, and the storage module may be a memory. The storage module is configured to store instructions, and the processing unit executes the instructions stored in the storage module, so that the network device performs a corresponding function in any one of the first aspect to the third aspect. When the apparatus is a chip or a chip set in a network device, the processing unit may be a processor, and the communication unit may be an input/output interface, a pin, a circuit, or the like. When the processing unit executes instructions stored in a storage module, the network device performs a corresponding function in any one of the first aspect to the third aspect. The storage module may be a storage module (for example, a register or a cache) in the chip or the chip set, or may be a storage module (for example, a read-only memory or a random access memory) that is in the network device and that is located outside the chip or the chip set.

According to a fifth aspect, a scheduling apparatus is provided, including a processor, a communication interface, and a memory. The communication interface is configured to transmit information, and/or a message, and/or data between the apparatus and another apparatus. The memory is configured to store computer-executable instructions, and when the apparatus runs, the processor executes the computer-executable instructions stored in the memory, so that the apparatus performs the scheduling method described in any design of the first aspect to the third aspect.

According to a sixth aspect, an embodiment of this application provides a computer-readable storage medium. The computer-readable storage medium stores program instructions, and when the program instructions are run on a network device, the network device executes any one of the first aspect or the designs of the first aspect, any one of the second aspect or the designs of the second aspect, or any one of the third aspect or the designs of the third aspect in embodiments of this application. For example, the computer-readable storage medium may be any available medium accessible by a computer. By way of example, and not limitation, the computer-readable medium may include a non-transient computer-readable medium, a random access memory (random access memory, RAM), a read-only memory (read-only memory, ROM), an electrically erasable programmable read-only memory (electrically EPROM, EEPROM), a CD-ROM or other optical disk storage, a disk storage medium or another disk storage device, or any other medium that can carry or store expected program code in a form of an instruction structure or a data structure and that can be accessed by a computer.

According to a seventh aspect, an embodiment of this application provides a communication apparatus, including a processor. When the processor executes a computer program or instructions in a memory, the method in the first aspect, the second aspect, or the third aspect is performed.

According to an eighth aspect, an embodiment of this application provides a communication apparatus, including a processor and a memory. The memory is configured to store a computer-executable program or instructions, and the processor is configured to execute the computer-executable program or the instructions stored in the memory, to enable the communication apparatus to perform the corresponding method in the first aspect, the second aspect, or the third aspect.

According to a ninth aspect, an embodiment of this application provides a communication apparatus, including a processor, a memory, and a transceiver. The transceiver is configured to receive or send a signal, the memory is configured to store program code or instructions, and the processor is configured to invoke the program code or the instructions from the memory, to perform the method in the first aspect, the second aspect, or the third aspect.

According to a tenth aspect, an embodiment of this application provides a communication apparatus, including a processor and an interface circuit. The interface circuit is configured to receive computer program code or instructions and transmit the computer program code or the instructions to the processor, and the processor runs the computer program code or the instructions, to perform the corresponding method in the first aspect, the second aspect, or the third aspect.

According to an eleventh aspect, an embodiment of this application provides a computer program product including computer program code or instructions. When the computer program code or the instructions are executed, the method in the first aspect, the second aspect, or the third aspect is implemented. For example, the computer program product may be a computer program product including a non-transitory computer-readable medium.

In addition, for technical effects brought by the fourth aspect to the eleventh aspect, refer to description in the first aspect to the third aspect. Details are not described herein again.

DESCRIPTION OF EMBODIMENTS

To facilitate understanding of embodiments of this application, the following describes terms related to embodiments of this application.

MAC layer scheduling: MAC layer scheduling mainly resolves problems such as time-frequency resource allocation, MCS selection, user pairing, and precoding. A tradeoff between a system throughput and fairness is achieved through MAC scheduling.

Figure 1:
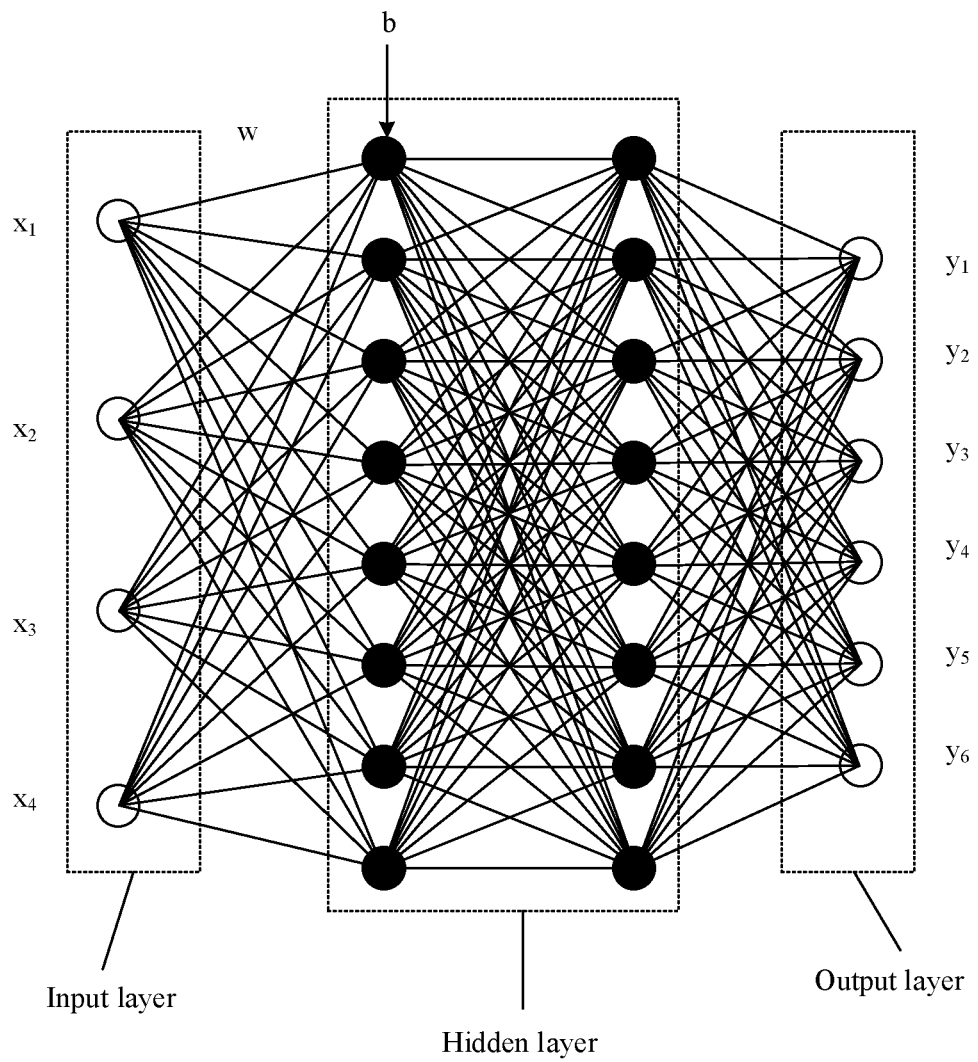
FIG. 1 is a schematic diagram of a fully-connected neural network according to an embodiment of this application.

A fully-connected neural network is also referred to as a multi-layer perceptron (multi-layer perceptron, MLP). One MLP includes an input layer (on the left), an output layer (on the right), and a plurality of hidden layers (in the middle). Each layer includes several nodes, which are referred to as neurons. Neurons at two adjacent layers are connected to each other. For example, there are two hidden layers. A fully-connected neural network model may be shown in FIG. 1, where w is a weight matrix, and b is a bias vector.

It should be noted that, with continuous development of technologies, the terms in embodiments of this application may change, but all of them shall fall within the protection scope of this application.

The scheduling method provided in this application may be applied to various communication systems, for example, the Internet of things (Internet of things, IoT), a narrow band Internet of things (narrow band Internet of things, NB-IoT), long term evolution (long term evolution, LTE), a 5th generation (5G) communication system, a hybrid architecture of LTE and 5G, a 5G NR system, a new communication system emerging in future communication development, or the like. The 5G communication system described in this application may include at least one of a non-standalone (non-standalone, NSA) 5G communication system or a standalone (standalone, SA) 5G communication system. The communication system may alternatively be a public land mobile network (public land mobile network, PLMN), a device-to-device (device-to-device, D2D) network, a machine-to-machine (machine-to-machine, M2M) network, a satellite communication network, or another network. The scheduling method provided in embodiments of this application may be used provided that a communication device performs MAC scheduling in the communication system.

Figure 2:
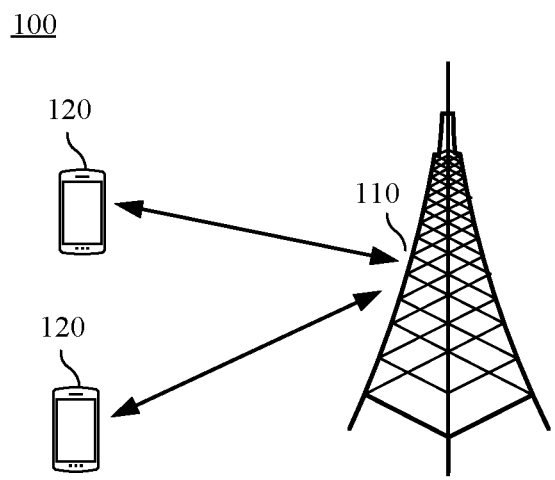
FIG. 2 is a schematic diagram of an architecture of a communication system according to an embodiment of this application.

For example, FIG. 2 shows a communication system 100 applicable to embodiments of this application. The communication system 100 includes a network device 110 and a terminal device 120. The network device 110 provides a communication service for the terminal device 120. It should be understood that only one network device 110 and two terminal devices 120 are used as an example in FIG. 2 for description, and a quantity of network devices and a quantity of terminal devices in the communication system are not specifically limited.

The terminal device in embodiments of this application is an entity on a user side that is configured to receive or transmit a signal. The terminal device may be a device that provides voice and data connectivity for a user, for example, a handheld device or a vehicle-mounted device having a wireless connection function. The terminal device may alternatively be another processing device connected to a wireless modem. The terminal device may communicate with one or more core networks through a radio access network (radio access network, RAN). The terminal device may also be referred to as a wireless terminal, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), a user device (user device), user equipment (user equipment), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). For example, common terminal devices include a mobile phone, a tablet computer, a notebook computer, a palmtop computer, a mobile Internet device (mobile Internet device, MID), and a wearable device such as a smartwatch, a smart band, or a pedometer. However, embodiments of this application are not limited thereto. The terminal device in embodiments of this application may alternatively be a terminal device or the like appearing in a future evolved PLMN. This is not limited in embodiments of this application.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (narrow band, NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device in embodiments of this application is an entity on a network side that is configured to transmit or receive a signal. The network device in embodiments of this application may be a device in a wireless network, for example, a RAN node that connects the terminal to the wireless network. For example, the network device may be an evolved NodeB (evolved NodeB, eNB or e-NodeB) in LTE, or may be a new radio controller (new radio controller, NR controller), may be a gNodeB (gNB) in a 5G system, may be a centralized unit (centralized unit, CU), may be a new radio base station, may be a radio remote module, may be a micro base station, may be a relay (relay), may be a distributed unit (distributed unit, DU), may be a home base station, may be a transmission reception point (transmission reception point, TRP) or a transmission point (transmission point, TP), or may be any other wireless access device. This is not limited in embodiments of this application. The network device may cover one or more cells.

Figure 3:
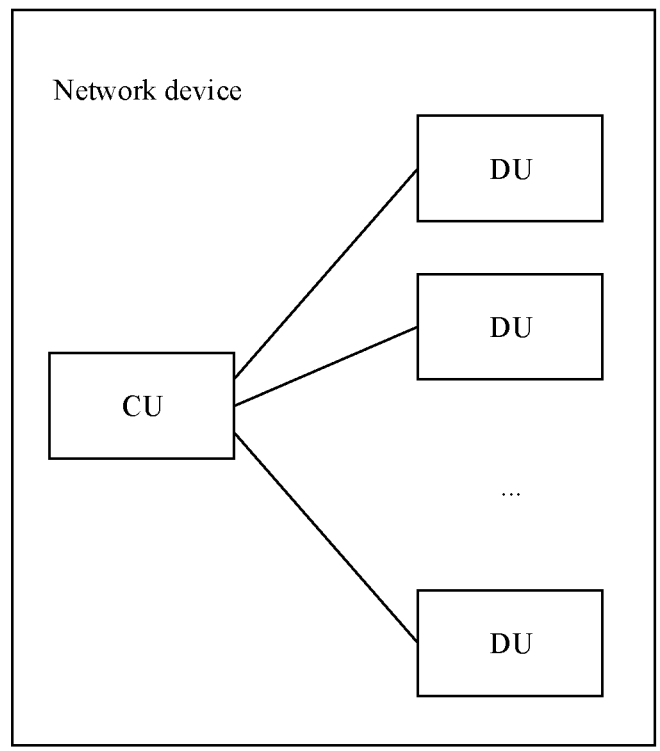
FIG. 3 is a schematic diagram of a structure of a base station according to an embodiment of this application.

For example, a structure of the network device in embodiments of this application may be shown in FIG. 3. Specifically, the network device may be divided into a CU and at least one DU. The CU may be configured to manage or control the at least one DU, which may also be referred to as that the CU is connected to the at least one DU. In the structure, protocol layers of a network in the communication system may be split. Some protocol layers are controlled by the CU in a centralized manner, functions of some or all remaining protocol layers are distributed in the DU, and the CU controls the DU in a centralized manner. For example, the network is a gNB. Protocol layers of the gNB include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this application.

Figure 4:
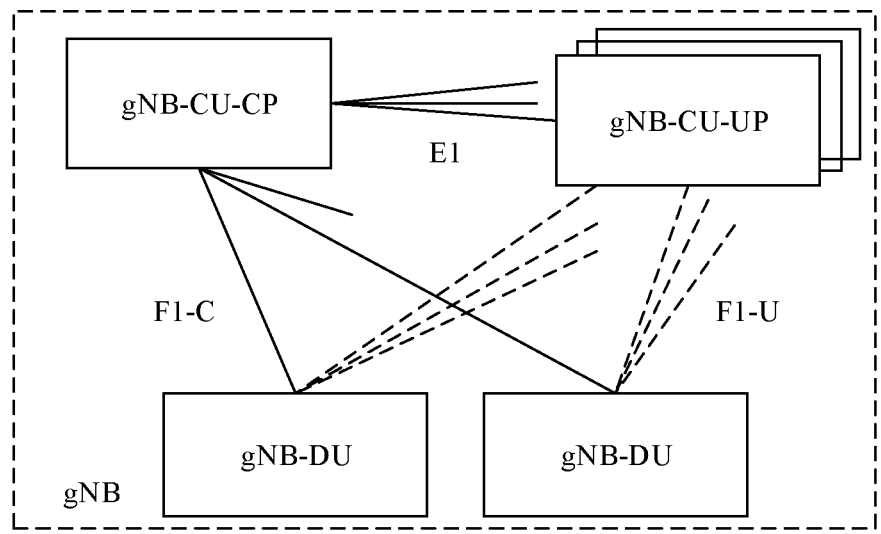
FIG. 4 is a schematic diagram of a structure of another base station according to an embodiment of this application.

For example, the CU in embodiments of this application may further be divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, the gNB is used as an example. A structure of the gNB may be shown in FIG. 4.

A network architecture and a service scenario described in embodiments of this application are intended to describe technical solutions in embodiments of this application more clearly, and do not constitute any limitation on the technical solutions provided in embodiments of this application. A person of ordinary skill in the art may know that with evolution of a network architecture and emergence of a new service scenario, the technical solutions provided in embodiments of this application are also applicable to a similar technical problem.

In an existing MAC layer scheduling algorithm, a communication system is usually modeled as a determined model, and a scheduling scheme is obtained through derivation of a formula. RBG allocation in a cellular network is used as an example. Common scheduling algorithms include an RR algorithm, a Max C/I algorithm, and a PF algorithm. The PF algorithm can achieve a good tradeoff between a throughput and fairness, and therefore is widely used. The following uses the PF algorithm as an example to describe a scheduling algorithm based on a determined model and a formula. The PF algorithm may select a scheduled user according to the following formula:

$$k = \underset{i}{\operatorname{argmax}} \frac{R_i(t)}{T_i(t)},$$

where $R_i(t)$ is an estimated throughput of a user i at a moment t, and is determined by factors such as a channel condition and a cache status of the user, and $T_i(t)$ is a historical accumulated throughput of the user i at the moment t. It can be seen that $R_i(t)/T_i(t)$ is a metric value that meets a throughput and fairness. A larger estimated throughput $R_i(t)$ indicates that the channel condition of the user is good, sufficient data in a cache needs to be sent, and therefore the metric value is larger. In addition, a larger accumulated throughput $T_i(t)$ indicates that the user has sent a large amount of data. For fairness, the user should send less data, and therefore the metric value is smaller. The tradeoff between the throughput and the fairness is implemented by selecting a user with a largest metric value for scheduling.

Due to complexity of the communication system, it is impossible to accurately model the communication system by using a closed-form model and formula. Therefore, a formula-based scheduling algorithm such as the PF algorithm cannot ensure optimal performance of the communication system.

Currently, MAC scheduling may be performed by using a deep neural network. A scale of the deep neural network (namely, a depth of the neural network and a quantity of neurons at each layer) is determined based on a quantity of to-be-scheduled terminal devices in an actual communication system. Usually, when there are a large quantity of to-be-scheduled terminal devices, both status space and action space for scheduling are large, and a large deep neural network is required. When there are a small quantity of to-be-scheduled users, a small deep neural network may be acceptable. When a quantity of to-be-scheduled users changes, there are two solutions. Solution 1: Re-determine a scale of a deep neural network, and retrain the deep neural network. Solution 2: Determine a scale of a deep neural network based on a possible maximum quantity of users for training. However, Solution 1 has poor generalization effect, and the deep neural network needs to be retrained after the quantity of users changes. Solution 2 needs to train a very large neural network, and training efficiency is low.

In view of this, an embodiment of this application provides a scheduling method and apparatus. The method and the apparatus are based on a same technical idea. The method and the apparatus have similar principles for resolving problems. Therefore, for implementations of the apparatus and the method, refer to each other. Details of repeated parts are not described again.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, a and b, a and c, b and c, or a, b, and c, where a, b, and c may be singular or plural.

In addition, it should be understood that in description of this application, terms such as "first" and "second" are merely used for differentiation and description, but should not be understood as an indication or implication of relative importance or an indication or implication of a sequence.

The following describes the technical solutions in embodiments of this application in detail with reference to the accompanying drawings.

Embodiment 1

Figure 5:
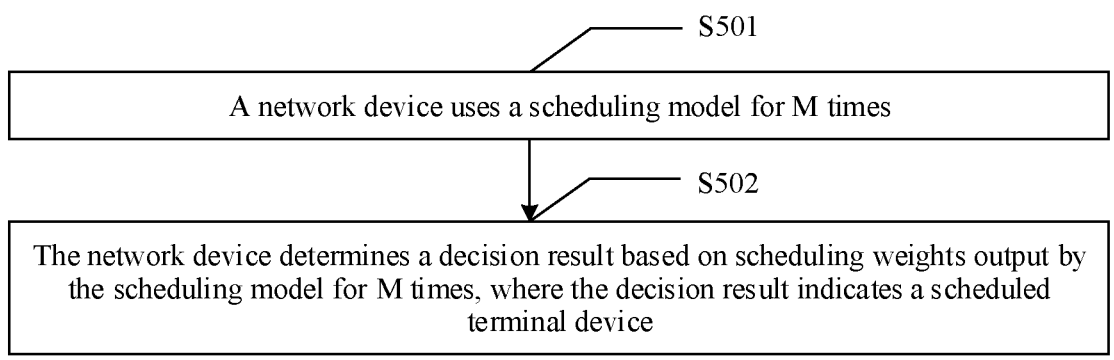
FIG. 5 is a schematic flowchart of a scheduling method according to an embodiment of this application.

FIG. 5 is a flowchart of a scheduling method according to this application. The method may be applied to a network device, or a chip or a chip set in a network device. The following is described by using an example in which the method is applied to the network device. The method includes the following steps.

S501: A network device uses a scheduling model for M times, where M is an integer greater than or equal to 1. The scheduling model is a neural network model obtained based on a quantity K of terminal devices that is input each time. It may alternatively be understood that the scheduling model is a neural network model applicable to K users, and K is an integer greater than 1. The scheduling model may be used in sequence, or may be used in parallel.

For example, K may be a preset value, or a value specified in a protocol. K may be equal to a possible minimum quantity of active users in a network. The quantity may be determined based on historical data, or a minimum quantity of active users in the network that is specified in a protocol. Alternatively, K may be determined in another manner, and details are not described herein.

Each time the network device uses the scheduling model, status information of K terminal devices in n to-be-scheduled terminal devices is input to the scheduling model, and the scheduling model outputs scheduling weights respectively corresponding to the K terminal devices.

For example, the n to-be-scheduled terminal devices may be terminal devices using a same scheduled time-frequency resource (for example, an RBG) in a communication system. Alternatively, the n to-be-scheduled terminal devices may be active terminal devices that are registered in a same cell and share a same radio transmission resource in a time division multiplexing manner, a frequency division multiplexing manner, a code division multiplexing manner, a space division multiplexing manner, or another multiplexing manner. The active terminal device may be understood as a terminal device that has new data and/or retransmitted data to be sent or received.

n may be less than or equal to K. In this case, the network device may use the scheduling model for one time, that is, input the n to-be-scheduled terminal devices to the scheduling model, to obtain scheduling weights respectively corresponding to the n to-be-scheduled terminal devices. For example, if n is equal to 1, the network device may input the status information of the terminal device to the scheduling model to determine the scheduling weight, or may directly determine that the terminal device is a scheduled terminal device.

n may alternatively be greater than K. In this case, the network device may use the scheduling model for a plurality of times (that is, M is greater than 1), that is, input the K to-be-scheduled terminal devices to the scheduling model each time, to obtain the scheduling weights respectively corresponding to the K to-be-scheduled terminal devices. Alternatively, the network device may use the scheduling model for one time (that is, M is equal to 1), that is, select K terminal devices from the n to-be-scheduled terminal devices and input the K terminal devices to the scheduling model, to obtain the scheduling weights respectively corresponding to the K to-be-scheduled terminal devices.

In an implementation, the network device may divide the n to-be-scheduled terminal devices into a plurality of terminal device groups, and each terminal device group includes K terminal devices. For each terminal device group, the network device inputs the status information of the K terminal devices included in the terminal device group to the scheduling model, to obtain the scheduling weights respectively corresponding to the K terminal devices included in the terminal device group. In a possible grouping method, terminal devices with a large difference in channel statuses are divided into a same group. Another grouping method may alternatively be used. For example, any K terminal devices are divided into one group, or terminal devices are grouped according to a preset rule. This is not specifically limited herein.

It should be noted that status information of one terminal device may be input to the scheduling model for one or more times, or may not be input to the scheduling model. In other words, in an implementation in which the n to-be-scheduled terminal devices are divided into a plurality of terminal device groups, one terminal device may not belong to any terminal device group, or may belong to one or more terminal device groups.

For example, the status information may include but is not limited to at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

S502: The network device determines a decision result based on the scheduling weights output by the scheduling model for M times, where the decision result indicates a scheduled terminal device.

There may be one scheduled terminal device. For example, when there is one available transmission resource in the communication system, one scheduled terminal device may be determined, and the available transmission resource is allocated to the scheduled terminal device.

There may be a plurality of scheduled terminal devices. For example, when there are L available transmission resources in the communication system, L scheduled terminal devices may be determined, and the L available transmission resources are respectively allocated to the L scheduled terminal devices.

In an implementation, step S502 may be implemented in the following manner:

A1: The network device uses a decision module for M times, where when the decision module is used for an $i^{th}$ time, a scheduling weight that is output when the scheduling model is used for an $i^{th}$ time is input to the decision module, to obtain a scheduled terminal device in the K terminal devices that is input when the scheduling model is used for the $i^{th}$ time, and i={1, 2, 3, . . . , M}. A2: The network device determines L to-be-scheduled terminal devices based on the scheduled terminal device in the K terminal devices that is input each time in the M times the scheduling model is used, where L is a positive integer. If a terminal device that is not input to the scheduling model exists in the network, the L to-be-scheduled terminal devices may include the terminal device that is not input to the scheduling model. In other words, in an implementation in which the n to-be-scheduled terminal devices are divided into a plurality of terminal device groups, if a terminal device that is not grouped exists in the network, the L to-be-scheduled terminal devices may include the terminal device that is not grouped.

A3: If L is less than or equal to K, the network device may input status information of the L to-be-scheduled terminal devices to the scheduling model, to obtain scheduling weights respectively corresponding to the L to-be-scheduled terminal devices. In an implementation, if L is less than K, the network device may further select one or more terminal devices from the n to-be-scheduled terminal devices, to form K terminal devices with the L terminal devices, and input status information of the K to-be-scheduled terminal devices to the scheduling model, to obtain scheduling weights respectively corresponding to the K to-be-scheduled terminal devices.

If L is greater than K, the terminal device may repeat step S501 and step A1 until the quantity of determined terminal devices is less than or equal to K, and input status information of the determined terminal devices to the scheduling model, to obtain scheduling weights respectively corresponding to the determined terminal devices.

A4: The network device inputs the scheduling weights obtained in step A3 to the decision module, to obtain the decision result.

For example, when there is one available transmission resource in the communication system, one scheduled terminal device may be determined based on the scheduling weights obtained in step A3, and the available transmission resource is allocated to the scheduled terminal device. The scheduled terminal device may be a terminal device corresponding to a maximum scheduling weight in the scheduling weights obtained in step A3.

For another example, when there are F available transmission resources in the communication system, F scheduled terminal devices may be determined based on the scheduling weights obtained in step A3, and the F available transmission resources are respectively allocated to the F scheduled terminal devices. The F scheduled terminal devices may be terminal devices corresponding to first F scheduling weights after the scheduling weights obtained in step A3 are sorted in descending order.

For example, the scheduling model may be a fully-connected neural network model. The scheduling model may include one input layer, at least one hidden layer, and one output layer. The input layer may be used to convert a dimension of input data into an input dimension at the hidden layer. The at least one hidden layer is used to perform feature extraction. The output layer is used to determine a scheduling weight based on a feature extracted by the at least one hidden layer.

In the foregoing example, each time the network device uses the scheduling model, the status information of the K terminal devices in the n to-be-scheduled terminal devices may be input to the input layer of the scheduling model for dimension conversion. In addition, the status information of the K terminal devices on which dimension conversion is performed is input to the hidden layer of the scheduling model for feature extraction, where the scheduling model includes one or more hidden layers. A feature extracted by the hidden layer is input to the output layer of the scheduling model, to obtain the scheduling weights respectively corresponding to the K terminal devices.

For example, a size of the input layer may be K×M, and M is a quantity of performance parameters included in the status information. For example, the status information includes four performance parameters: an estimated throughput of the terminal device, an average throughput of the terminal device, a cache queue length of the terminal device, and a packet delay of the terminal device, and M is equal to 4.

A quantity of neurons at the hidden layers may be K×M×a, where values of a at different hidden layers may be the same or may be different. This is not specifically limited herein.

To better understand Embodiment 1 of this application, the following describes a scheduling process in Embodiment 1 with reference to a specific scenario by using an example in which K is equal to 3.

Figure 6:
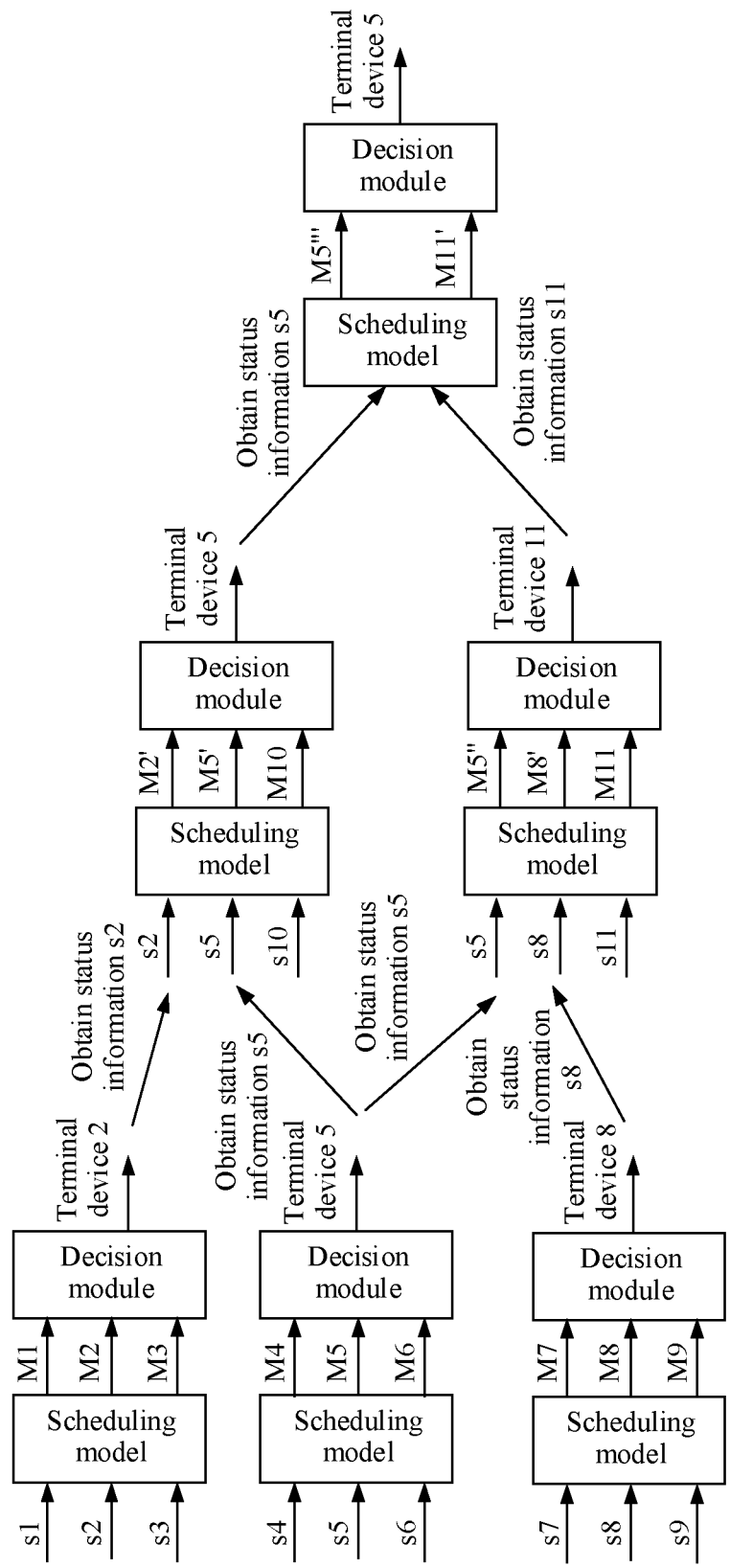
FIG. 6 is a schematic diagram of a scheduling process according to an embodiment of this application.

It is assumed that there are 11 to-be-scheduled terminal devices in the network, namely, a terminal device 1 to a terminal device 11, and there is one available transmission resource in the communication system. As shown in FIG. 6, the scheduling process includes the following steps:

B1: The network device inputs status information of the terminal device 1 to the terminal device 11 to the scheduling model for three times, where status information of three terminal devices is input each time.

For example, the network device inputs status information s1 of the terminal device 1, status information s2 of the terminal device 2, and status information s3 of the terminal device 3 to the scheduling model, to obtain a scheduling weight M1 of the terminal device 1, a scheduling weight M2 of the terminal device 2, and a scheduling weight M3 of the terminal device 3. In addition, the network device inputs status information s4 of the terminal device 4, status information s5 of the terminal device 5, and status information s6 of the terminal device 6 to the scheduling model, to obtain a scheduling weight M4 of the terminal device 4, a scheduling weight M5 of the terminal device 5, and a scheduling weight M6 of the terminal device 6. The network device inputs status information s7 of the terminal device 7, status information s8 of the terminal device 8, and status information s9 of the terminal device 9 to the scheduling model, to obtain a scheduling weight M7 of the terminal device 7, a scheduling weight M8 of the terminal device 8, and a scheduling weight M9 of the terminal device 9.

B2: The network device inputs M1, M2, and M3 to the decision module, to determine a terminal device corresponding to a highest scheduling weight, where it is assumed that the terminal device corresponding to a highest scheduling weight is the terminal device 2. The network device inputs M4, M5, and M6 to the decision module, to determine a terminal device corresponding to a highest scheduling weight, where it is assumed that the terminal device corresponding to a highest scheduling weight is the terminal device 5. The network device inputs M7, M8, and M9 to the decision module, to determine a terminal device corresponding to a highest scheduling weight, where it is assumed that the terminal device corresponding to a highest scheduling weight is the terminal device 8.

B3: The network device inputs the status information of the terminal device 2, the terminal device 5, the terminal device 8, the terminal device 10, and the terminal device 11 to the scheduling model for two times, where status information of three terminal devices is input each time.

For example, the network device inputs the status information s2 of the terminal device 2, the status information s5 of the terminal device 5, and status information s10 of the terminal device 10 to the scheduling model, to obtain a scheduling weight MT of the terminal device 2, a scheduling weight M5' of the terminal device 5, and a scheduling weight M10 of the terminal device 10. The network device inputs the status information s5 of the terminal device 5, the status information s8 of the terminal device 8, and status information s11 of the terminal device 11 to the scheduling model, to obtain a scheduling weight M5'' of the terminal device 5, a scheduling weight M8' of the terminal device 8, and a scheduling weight M11 of the terminal device 11.

B4: The network device inputs M2', M5', and M10 to the decision module, to determine a terminal device corresponding to a highest scheduling weight, where it is assumed that the terminal device corresponding to a highest scheduling weight is the terminal device 5. The network device inputs M5'', M8', and M11 to the decision module, to determine a terminal device corresponding to a highest scheduling weight, where it is assumed that the terminal device corresponding to a highest scheduling weight is the terminal device 11.

B5: The network device inputs the status information s5 of the terminal device 5 and the status information s11 of the terminal device 11 to the scheduling model, to obtain a scheduling weight M5' of the terminal device 5 and a scheduling weight M11' of the terminal device 11.

B6: The network device inputs M5''' and M11' to the decision module, to determine a terminal device corresponding to a highest scheduling weight, where it is assumed that the terminal device corresponding to a highest scheduling weight is the terminal device 5, and the terminal device 5 is the scheduled terminal device.

B7: The network device allocates the available transmission resource in the communication system to the terminal device 5.

It should be noted that in B5, the network device may alternatively input the status information s5 of the terminal device 5, the status information s11 of the terminal device 11, and status information sj of another terminal device j to the scheduling model, to obtain a scheduling weight M5''' of the terminal device 5, a scheduling weight M11' of the terminal device 11, and a scheduling weight Mj of the terminal device j. Then, in B6, the network device inputs M5''', M11', and Mj to the decision module, to determine a terminal device corresponding to a highest scheduling weight.

A neural network model applicable to K users is established in embodiments of this application. It may be understood that the neural network model includes a parameter set applicable to the K terminal devices, and to-be-scheduled terminal devices in a communication system may share the parameter set. In other words, the neural network model may be used for a plurality of times during scheduling decision. The network device may determine, by using the parameter set, scheduling weights corresponding to a group of to-be-scheduled terminal devices in the communication system group by group, where each group includes K to-be-scheduled terminal devices. Therefore, regardless of a quantity of to-be-scheduled terminal devices in the communication system, the network device may reuse the neural network model without re-establishing a neural network model, so that the neural network model is expandable and applicable to scenarios in which quantities of to-be-scheduled terminal devices are different.

In addition, K may be determined based on a minimum quantity of active users in the network in embodiments of this application, so that a scale of the established neural network (namely, a depth of the neural network and a quantity of neurons at each layer) is small. This can improve training efficiency, and save computing resources.

Embodiment 2

Figure 7:
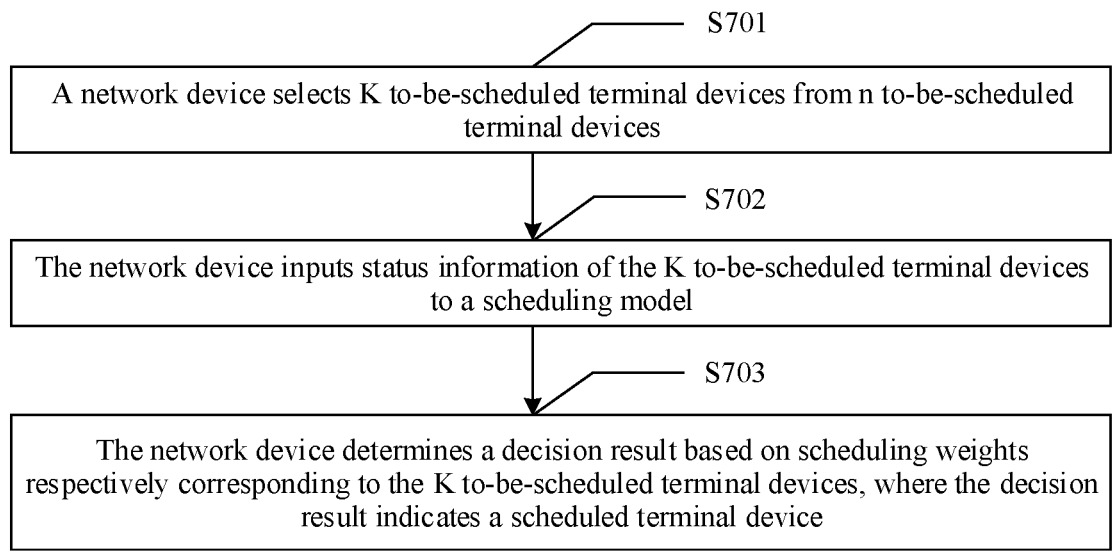
FIG. 7 is a schematic flowchart of another scheduling method according to an embodiment of this application.

FIG. 7 is a flowchart of a scheduling method according to this application. The method may be applied to a network device, or a chip or a chip set in a network device. The following is described by using an example in which the method is applied to the network device. The method includes the following steps.

S701: A network device selects K to-be-scheduled terminal devices from n to-be-scheduled terminal devices. K is a quantity of terminal devices to which a scheduling model is applicable.

The n to-be-scheduled terminal devices may be terminal devices using a same scheduled time-frequency resource (for example, an RBG) in a communication system. Alternatively, the n to-be-scheduled terminal devices may be active terminal devices that are registered in a same cell and share a same radio transmission resource in a time division multiplexing manner, a frequency division multiplexing manner, a code division multiplexing manner, a space division multiplexing manner, or another multiplexing manner. The active terminal device may be understood as a terminal device that has new data and/or retransmitted data to be sent or received.

n may be greater than K. In this case, the K terminal devices may be selected by performing step S701.

n may alternatively be less than or equal to K. In this case, the network device may input the n to-be-scheduled terminal devices to the scheduling model, to obtain scheduling weights respectively corresponding to the n to-be-scheduled terminal devices. It may be understood that the selected terminal devices are the n to-be-scheduled terminal devices, or it may be understood that when n is less than or equal to K, step S701 may not be performed, and the n to-be-scheduled terminal devices are input to the scheduling model.

In an implementation, when selecting the K to-be-scheduled terminal devices from the n to-be-scheduled terminal devices, the network device may sort the n to-be-scheduled terminal devices based on at least one performance parameter in status information, and determine the K to-be-scheduled terminal devices based on the sorted n to-be-scheduled terminal devices. The at least one performance parameter may be one or more of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, a historical throughput of the terminal device, and the like. For example, the network device may sort the n to-be-scheduled terminal devices in ascending order based on the average throughput of the terminal device, and then select first K terminal devices as the selected terminal devices.

When selecting the K to-be-scheduled terminal devices from the n to-be-scheduled terminal devices, the network device may further preferentially select, based on a service type of the terminal device, a terminal device with a high service real-time requirement, for example, preferentially select a virtual reality (virtual reality, VR)/augmented reality (augmented reality, AR) service terminal device, secondly select a terminal device for real-time voice call and video services, and thirdly select a terminal device for a web page browsing service.

Alternatively, when selecting the K to-be-scheduled terminal devices from the n to-be-scheduled terminal devices, the network device may preferentially select, based on a priority of the terminal device, a terminal device with a higher priority. The priority of the terminal device is specified in a standard, determined by a service provider or a telecommunications operator, or determined based on a geographical location. For example, a terminal device close to the network device has a high priority, and a terminal device far from the network device has a low priority.

S702: The network device inputs status information of the K to-be-scheduled terminal devices to the scheduling model. The scheduling model is a neural network model obtained based on the quantity K of selected terminal devices. It may alternatively be understood that the scheduling model is a neural network model applicable to K users, and K is an integer greater than 1.

For example, K may be a preset value, or a value specified in a protocol. K may be equal to a possible minimum quantity of active users in a network. The quantity may be determined based on historical data, or a minimum quantity of active users in the network that is specified in a protocol.

Alternatively, K may be determined in another manner, and details are not described herein.

For example, the status information may include but is not limited to at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

A structure of the scheduling model in Embodiment 2 is similar to a structure of the scheduling model in Embodiment 1, and similarities are not described again.

S703: The network device determines a decision result based on the scheduling weights respectively corresponding to the K to-be-scheduled terminal devices, where the decision result indicates a scheduled terminal device.

There may be one scheduled terminal device. For example, when there is one available transmission resource in the communication system, one scheduled terminal device may be determined, and the available transmission resource is allocated to the scheduled terminal device. The scheduled terminal device may be a terminal device corresponding to a maximum scheduling weight.

There may be a plurality of scheduled terminal devices. For example, when there are F available transmission resources in the communication system, F scheduled terminal devices may be determined, and the F available transmission resources are respectively allocated to the F scheduled terminal devices. The F scheduled terminal devices may be first F terminal devices sorted in descending order based on scheduling weights.

A neural network model applicable to K users is established in embodiments of this application. It may be understood that the neural network model includes a parameter set applicable to the K terminal devices, and to-be-scheduled terminal devices are selected, so that the neural network model may be used in a scenario in which a quantity of to-be-scheduled terminal devices is greater than K without re-establishing a neural network model. Therefore, the neural network model is expandable and applicable to scenarios in which quantities of to-be-scheduled terminal devices are different.

In addition, K may be determined based on a minimum quantity of active users in the network in embodiments of this application, so that a scale of the established neural network model (namely, a depth of the neural network and a quantity of neurons at each layer) is small. This can improve training efficiency, and save computing resources.

Embodiment 3

Figure 8:
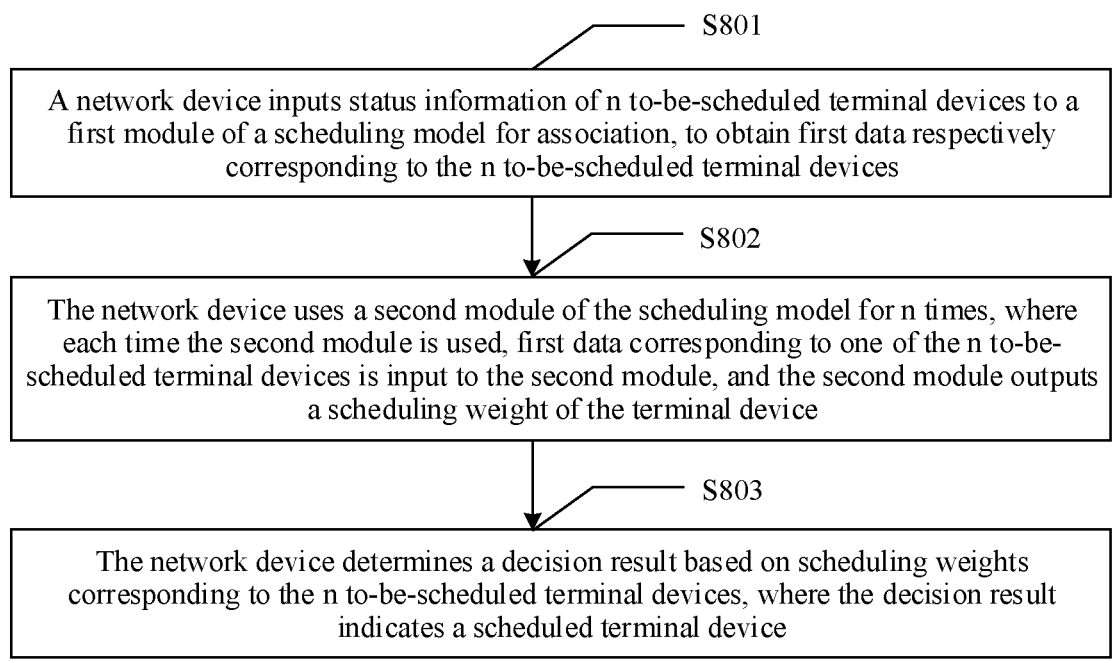
FIG. 8 is a schematic flowchart of still another scheduling method according to an embodiment of this application.

FIG. 8 is a flowchart of a scheduling method according to this application. The method may be applied to a network device, or a chip or a chip set in a network device. The following is described by using an example in which the method is applied to the network device. The method includes the following steps.

S801: A network device inputs status information of n to-be-scheduled terminal devices to a first module of a scheduling model for association, to obtain first data respectively corresponding to the n to-be-scheduled terminal devices, where the first data is data obtained after the status information of the terminal devices corresponding to the first data is associated with status information of another terminal device, and n is an integer greater than or equal to 1.

The n to-be-scheduled terminal devices may be terminal devices using a same scheduled time-frequency resource (for example, an RBG) in a communication system. Alternatively, the n to-be-scheduled terminal devices may be active terminal devices that are registered in a same cell and share a same radio transmission resource in a time division multiplexing manner, a frequency division multiplexing manner, a code division multiplexing manner, a space division multiplexing manner, or another multiplexing manner. The active terminal device may be understood as a terminal device that has new data and/or retransmitted data to be sent or received.

For example, the status information may include but is not limited to at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

S802: The network device uses a second module of the scheduling model for n times, where each time the second module is used, first data corresponding to one of then to-be-scheduled terminal devices is input to the second module, and the second module outputs a scheduling weight of the terminal device. The second module may be used in sequence, or may be used in parallel.

The second module is a neural network obtained based on one terminal device, to determine the scheduling weight. It should be understood that the second module is obtained (or established) based on one terminal device, and includes a parameter set applicable to one terminal device. To-be-scheduled terminal devices in the communication system may share the parameter set. The network device may determine, by using the parameter set, scheduling weights corresponding to the to-be-scheduled terminal devices in the communication system one by one. Therefore, regardless of a quantity of to-be-scheduled terminal devices in the communication system, the network device may reuse the second module without re-establishing a neural network.

S803: The network device determines a decision result based on scheduling weights corresponding to the n to-be-scheduled terminal devices, where the decision result indicates a scheduled terminal device.

In an implementation, the network device may input the scheduling weights corresponding to the n to-be-scheduled terminal devices to a decision module, to determine a scheduled terminal device, and the decision module is configured to determine a scheduled terminal device based on the scheduling weights corresponding to the n to-be-scheduled terminal devices.

There may be one scheduled terminal device. For example, when there is one available transmission resource in the communication system, one scheduled terminal device may be determined, and the available transmission resource is allocated to the scheduled terminal device. The scheduled terminal device may be a terminal device corresponding to a maximum scheduling weight.

There may be a plurality of scheduled terminal devices. For example, when there are L available transmission resources in the communication system, L scheduled terminal devices may be determined, and the L available transmission resources are respectively allocated to the L scheduled terminal devices. The L scheduled terminal devices may be first L terminal devices sorted in descending order based on scheduling weights.

For example, the scheduling model may further include a third module, and the third module may be a neural network obtained based on one terminal device, to perform feature extraction.

The third module may be a neural network obtained based on one terminal device, to perform feature extraction. It should be understood that the third module is obtained (or established) based on one terminal device, and includes a parameter set applicable to one terminal device. To-be-scheduled terminal devices in the communication system may share the parameter set. The network device may perform, by using the parameter set, feature extraction on the to-be-scheduled terminal devices in the communication system one by one. Therefore, regardless of a quantity of to-be-scheduled terminal devices in the communication system, the network device may reuse the third module without re-establishing a neural network.

In an implementation, before inputting the status information of the n to-be-scheduled terminal devices to the first module of the scheduling model for association, the network device may use the third module for n times, where each time the third module is used, status information of one of then to-be-scheduled terminal devices is input to the third module, and the third module outputs second data of the terminal device. The third module may be used in sequence, or may be used in parallel.

Further, when inputting the status information of then to-be-scheduled terminal devices to the first module of the scheduling model for association, the network device may input second data of then to-be-scheduled terminal devices to the first module for association.

The scheduling model may further include a fourth module, and the fourth module may be a neural network obtained based on one terminal device, to perform dimension increasing.

The fourth module may be a neural network obtained based on one terminal device, to perform feature extraction. It should be understood that the fourth module is obtained (or established) based on one terminal device, and includes a parameter set applicable to one terminal device. To-be-scheduled terminal devices in the communication system may share the parameter set. The network device may perform, by using the parameter set, dimension increasing on the to-be-scheduled terminal devices in the communication system one by one. Therefore, regardless of a quantity of to-be-scheduled terminal devices in the communication system, the network device may reuse the fourth module without re-establishing a neural network.

In an implementation, before using the third module for n times, the network device may use the fourth module for n times, where each time the fourth module is used, status information of one of then to-be-scheduled terminal devices is input to the fourth module, and the fourth module outputs status information of the terminal device obtained through dimension increasing. The fourth module may be used in sequence, or may be used in parallel.

Further, each time the network device uses the third module, the network device may input status information of one of the n to-be-scheduled terminal devices obtained through dimension increasing to the third module.

The scheduling model in Embodiment 3 of this application is not limited to including the first module to the fourth module. As long as at least one module in the scheduling model can be repeatedly used, and data of one terminal device is input each time the module is used, the scheduling model can be understood as the scheduling model in Embodiment 3 of this application.

Figure 9:
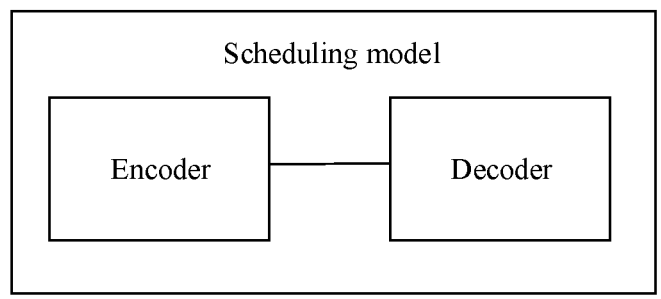
FIG. 9 is a schematic diagram of a structure of a scheduling model according to an embodiment of this application.

For example, the scheduling model may be a neural network model based on a transformer (Transformer) network. As shown in FIG. 9, the transformer network may include an encoder (Encoder) and a decoder (Decoder). The encoder is configured to perform feature extraction, and the decoder is configured to determine a scheduling weight.

The encoder may include an embedding layer (embedding layer) and a multi-head attention (Multi-head attention) network. The embedding layer is used to perform dimension increasing, and may also be understood as changing a dimension of input data from an a dimension to a b dimension, where a is less than b. The multi-head attention network is used to perform feature extraction on data obtained through dimension increasing. For example, the embedding layer may include a parameter set applicable to a terminal device. The network device may perform, by repeatedly using the embedding layer, dimension increasing on the to-be-scheduled terminal devices in the communication system one by one.

The multi-head attention network in the encoder may have one or more layers. This is not specifically limited herein. When the multi-head attention network includes a plurality of layers, structures of the layers may be the same. Each layer of the multi-head attention network may include at least one head (head), a concatenation module, and a first MLP. The concatenation module is configured to concatenate an output of the at least one head, and the first MLP is configured to perform feature extraction on data output by the concatenation module. It should be noted that the first MLP in the encoder may include one or more hidden layers. This is not specifically limited herein. For example, the first MLP may include a parameter set applicable to a terminal device. The network device may perform, by repeatedly using the first MLP, feature extraction on the to-be-scheduled terminal devices in the communication system one by one.

Structures of heads may be the same. A head may include a linear query processing module, a linear key processing module, a linear value processing module, and a scaled dot-product attention (Scaled Dot-product attention) module. The linear query processing module is configured to multiply an input of the head and a linear query matrix W_Q, to obtain a query vector. The linear key processing module is configured to multiply the input of the head and a linear key matrix W_U, to obtain a key vector. The linear value processing module is configured to multiply the input of the head and a linear value matrix W_V, to obtain a value vector. The scaled dot-product attention module is configured to associate a query matrix Q including query vectors of a plurality of users, a key matrix K including key vectors of the plurality of users, with a value matrix V including value vectors of the plurality of users, to obtain a processing result. The processing result may meet the following formula:

$$Z = \mathrm{softmax}\left(\frac{Q \cdot U^T}{\sqrt{d}}\right)V,$$

where $(\ )^T$ is a matrix transpose operation, d is a matrix dimension of $Q \cdot U^T$, and softmax( ) is used to determine a correlation probability (or a weight) corresponding to each terminal device.

For example, the linear query processing module, the linear key processing module, and the linear value processing module are all matrices applicable to a terminal device.

The network device may repeatedly use the linear query processing module to determine query vectors for the to-be-scheduled terminal devices in the communication system one by one, repeatedly use the linear key processing module to determine key vectors for the to-be-scheduled terminal devices in the communication system one by one, and repeatedly use the linear value processing module to determine value vectors for the to-be-scheduled terminal devices in the communication system one by one.

Figure 10:
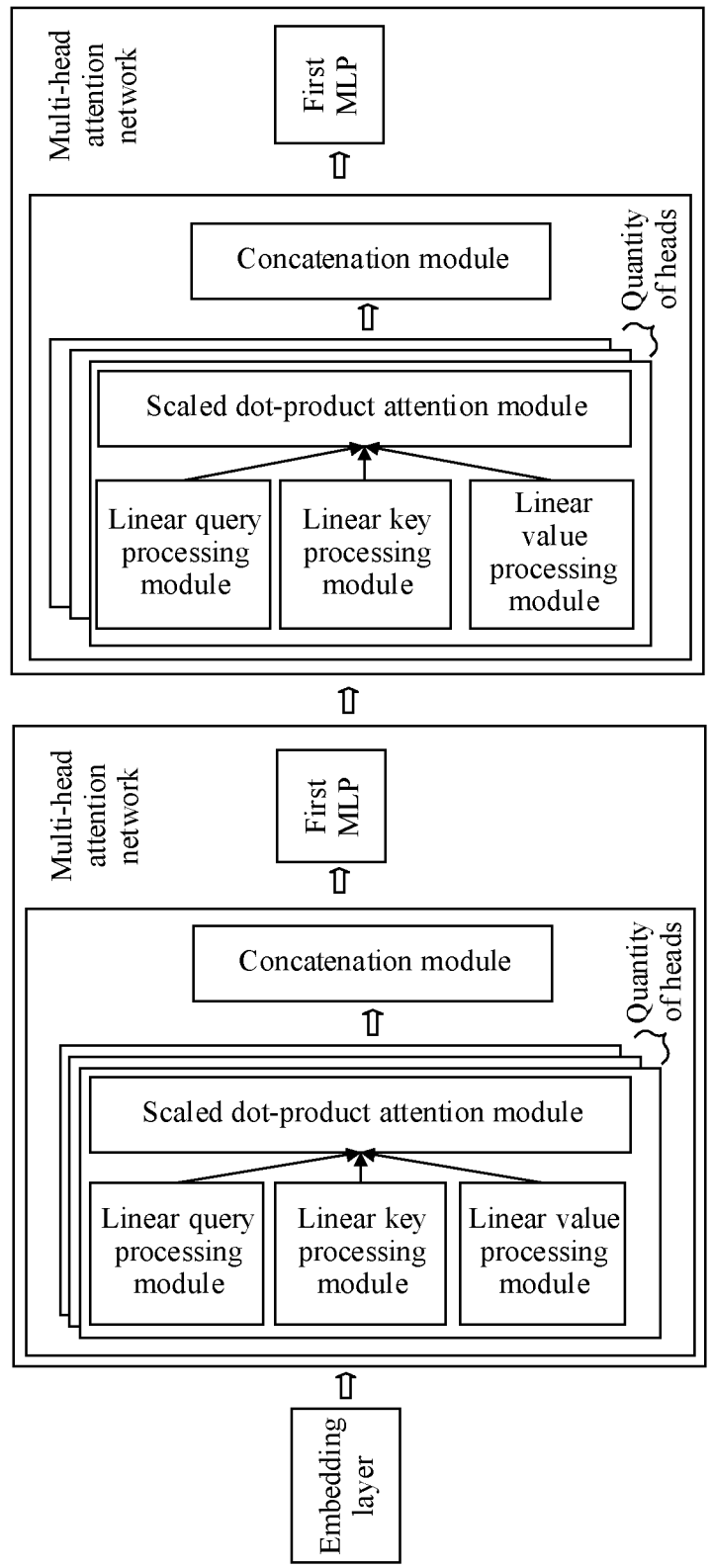
FIG. 10 is a schematic diagram of a structure of an encoder according to an embodiment of this application.

For example, the encoder includes two layers of multi-head attention networks, and each layer of multi-head attention network includes three heads. A structure of the encoder may be shown in FIG. 10. Parameters of the multi-head attention networks may be the same or may be different. This is not specifically limited herein. For example, parameters of modules in the first-layer multi-head attention network in the encoder shown in FIG. 10 may be the same as or different from parameters of modules in the second-layer multi-head attention network.

Figure 11:
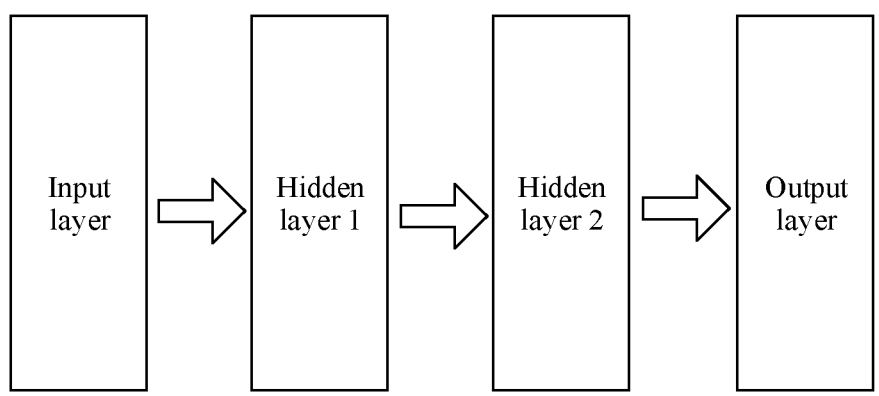
FIG. 11 is a schematic diagram of a structure of a translator according to an embodiment of this application.

The decoder may include a second MLP, and the second MLP is configured to determine a scheduling weight based on a feature extracted by the encoder. It should be noted that the second MLP in the decoder may include one or more hidden layers. This is not specifically limited herein. Two hidden layers are used as an example, and the second MLP may be shown in FIG. 11.

For example, the second MLP may be a matrix applicable to a terminal device, and the network device may determine, by repeatedly using the second MLP, scheduling weights corresponding to the to-be-scheduled terminal devices in the communication system one by one.

For example, the fourth module in Embodiment 3 of this application may be the embedding layer of the encoder. The third module in Embodiment 3 of this application may include the linear query processing module, the linear key processing module, and the linear value processing module that are included in each head in the encoder. The first module in Embodiment 3 of this application may include the scaled dot-product attention module included in each head in the encoder. The second module in Embodiment 3 of this application may include the concatenation module included in the multi-head attention network in the encoder, the first MLP included in the multi-head attention network in the encoder, and the second MLP included in the decoder. For example, the encoder includes one layer of multi-head attention network, and the one layer of multi-head attention network includes three heads, as shown in FIG. 12.

Figure 12:
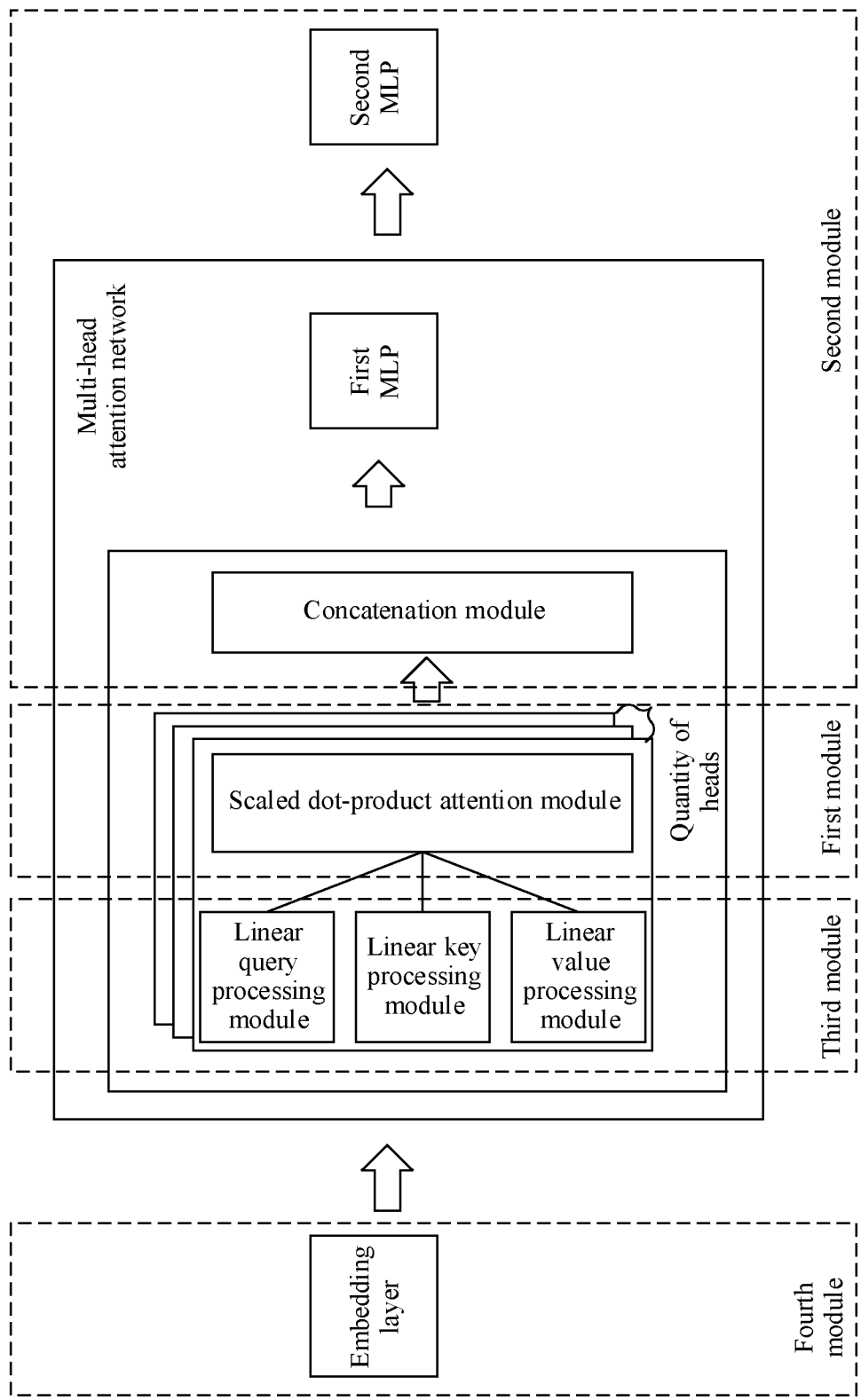
FIG. 12 is a schematic diagram of a structure of a scheduling model according to an embodiment of this application.

To better understand Embodiment 3 of this application, the following describes the scheduling process in Embodiment 1 with reference to the scheduling model shown in FIG. 12.

Figure 13:
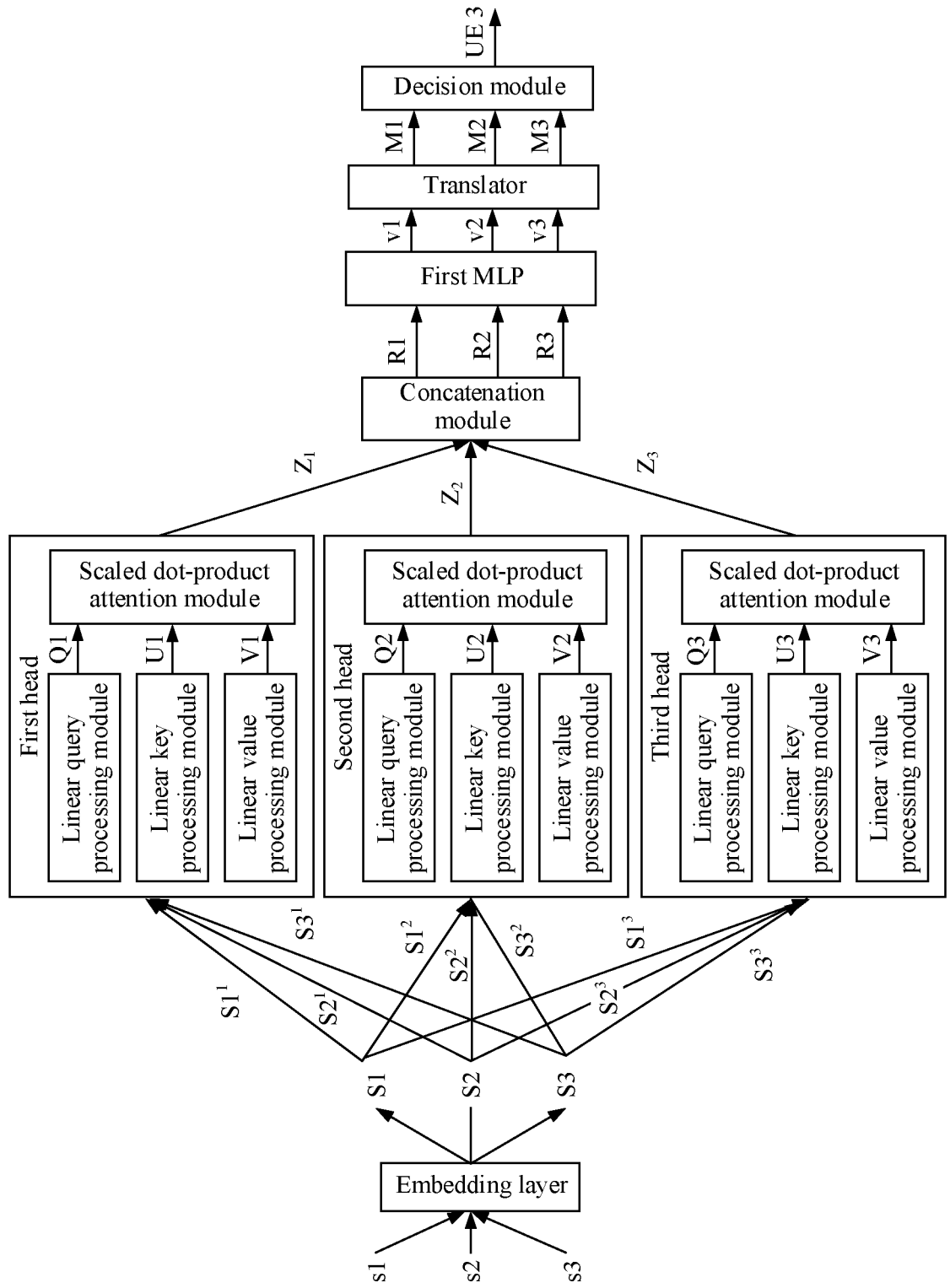
FIG. 13 is a schematic diagram of a scheduling process according to an embodiment of this application.

It is assumed that there are 3 to-be-scheduled terminal devices in the network, namely, UE 1 to UE 3, and there is one available transmission resource in the communication system. As shown in FIG. 13, the scheduling process includes the following steps.

C1: The network device inputs status information s1 to s3 of the UE 1 to the UE 3 one by one to the embedding layer for dimension increasing, to obtain dimension increasing data S1 to S3 of the UE 1 to the UE 3, where the embedding layer may be used to perform dimension increasing on status information of one terminal device. The network device may use the embedding layer in parallel to respectively perform dimension increasing on the status information of the UE 1 to the UE 3, or may sequentially use the embedding layer to respectively perform dimension increasing on the status information of the UE 1 to the UE 3.

C2: The network device respectively divides the dimension increasing data of the UE 1 to the UE 3 into three parts, where the three parts may be divided according to a preset rule, for example, values corresponding to a similar quantity of performance parameters are divided into a same part, or the three parts may be randomly divided.

C3: The network device inputs first-part dimension increasing data S'1, S2', and S3' of the UE 1 to the UE 3 to a first head in the multi-head attention network for processing, to obtain $Z_1$.

A processing process of the first head includes: respectively processing $S1^1$, $S2^1$, and $S3^1$ by using the linear query processing module (that is, respectively multiplying $S1^1$, $S2^1$, and $S3^1$ and the linear query matrix W_Q), to obtain query vectors of the UE 1 to the UE 3; respectively processing $S1^1$, $S2^1$, and $S3^1$ by using the linear key processing module (that is, respectively multiplying $S1^1$, $S2^1$, and $S3^1$ and the linear key matrix W_U), to obtain key vectors of the UE 1 to the UE 3; respectively processing $S1^1$, $S2^1$, and $S3^1$ by using the linear value processing module (that is, respectively multiplying $S1^1$, $S2^1$, and $S3^1$ and the linear value matrix W_V), to obtain value vectors of the UE 1 to the UE 3; and associating, by using the scaled dot-product attention module, a query matrix $Q_1$ including the query vectors of the UE 1 to the UE 3, $Q_1$=[the query vector of the UE 1, the query vector of the UE 2, the query vector of the UE 3], a key matrix $U_1$ including the key vectors of the UE 1 to the UE 3, $U_1$=[the key vector of the UE 1, the key vector of the UE 2, the key vector of the UE 3], with a value matrix $V_1$ including the value vectors of the UE 1 to the UE 3, $V_1$=[the value vector of the UE 1, the value vector of the UE 2, the value vector of the UE 3], to obtain $Z_1$. An operation of the scaled dot-product attention module is as follows:

$$Z_1 = \operatorname{softmax}\left(\frac{Q_1 \cdot U_1^T}{\sqrt{d}}\right) V_1,$$

where an operation $Q_1 \cdot U_1^T$ calculates a point multiplication result of the query vectors of each UE and the key vectors of all UEs (including the UE), a normalization operation (namely, dividing by $\sqrt{d}$) is performed on the result, and softmax is calculated, to obtain pairwise correlations between each UE and all UEs (including the UE). An association status may be provided in a form of a percentage, and a larger percentage indicates a higher correlation between two UEs. The pairwise correlations are multiplied by the value vector of each UE, to obtain an association status between each UE and all UEs (including the UE). $Z_1$=[UE $1^{(1)}$, UE $2^{(1)}$, UE $3^{(1)}$], where UE $1^{(1)}$=a correlation probability between the UE 1 and the UE 1×the value vector corresponding to $S1^1$+a correlation probability between the UE 1 and the UE 2×the value vector corresponding to $S2^1$+a correlation probability between the UE 1 and the UE 3×the value vector corresponding to $S3^1$;

UE $2^{(1)}$=a correlation probability between the UE 2 and the UE 1×the value vector corresponding to $S1^1$+a correlation probability between the UE 2 and the UE 2×the value vector corresponding to $S2^1$+a correlation probability between the UE 2 and the UE 3×the value vector corresponding to $S3^1$; and UE $3^{(1)}$=a correlation probability between the UE 3 and the UE 1×the value vector corresponding to $S1^1$+a correlation probability between the UE 3 and the UE 2×the value vector corresponding to S2$^1$+a correlation probability between the UE 3 and the UE 3×the value vector corresponding to S3$^1$.

The network device may use the linear query processing module, the linear key processing module, and the linear value processing module in parallel, or may sequentially use the linear query processing module, the linear key processing module, and the linear value processing module.

The network device inputs second-part dimension increasing data S1$^2$, S2$^2$, and S3$^2$ of the terminal device 1 to the terminal device 3 to a second head in the multi-head attention network for processing, to obtain $Z_2$, where $Z_2$= [UE 1$^{(2)}$, UE 2$^{(2)}$, UE 3$^{(2)}$].

The network device inputs third-part dimension increasing data S1$^3$, S2$^3$, and S3$^3$ of the terminal device 1 to the terminal device 3 to a third head in the multi-head attention network for processing, to obtain $Z_3$, where $Z_3$=[UE 1$^{(3)}$, UE 2$^{(3)}$, UE 3$^{(3)}$].

Processing processes of the second head and the third head are similar to the processing process of the first head. Details of repeated parts are not described again.

C4: The network device processes the data $Z_1$, $Z_2$, and $Z_3$ by using the concatenation module in the multi-head attention network, to obtain cascaded data R1 of the UE 1, R1=[UE 1$^{(1)}$, UE 1$^{(2)}$, UE 1$^{(3)}$], cascaded data R2 of the UE 2, R2=[UE 2$^{(1)}$, UE 2$^{(2)}$, UE 2$^{(3)}$], and cascaded data R3 of the UE 3, R3=[UE 3$^{(1)}$, UE 3$^{(2)}$, UE 3$^{(3)}$].

C5: The network device respectively performs feature extraction on R1, R2, and R3 by using the first MLP in the multi-head attention network, to obtain output data v1 to v3 respectively corresponding to the UE 1 to the UE 3.

The network device may determine the output data of the UE 1 to the UE 3 by using the first MLP in parallel, or may determine the output data of the UE 1 to the UE 3 by sequentially using the first MLP.

C6: The network device respectively processes, by using the decoder, the output data of the UE 1 to the UE 3, to determine scheduling weights M1 to M3 respectively corresponding to the UE 1 to the UE 3.

The network device may determine the scheduling weights M1 to M3 respectively corresponding to the UE 1 to the UE 3 by using the decoder in parallel, or may determine the scheduling weights M1 to M3 respectively corresponding to the UE 1 to the UE 3 by sequentially using the decoder.

C7: The network device inputs M1 to M3 to the decision module, to determine a terminal device corresponding to a highest scheduling weight, where it is assumed that the terminal device corresponding to a highest scheduling weight is the UE 3, and the UE 3 is a scheduled terminal device.

C8: The network device allocates the available transmission resource in the communication system to the UE 3.

A plurality of users share a parameter of a module other than the scaled dot-product attention module in the scheduling model in Embodiment 3 of this application, so that a scale of the scheduling model (namely, a depth of a neural network and a quantity of neurons at each layer) is small. Therefore, the scheduling model is expandable and applicable to scenarios in which quantities of to-be-scheduled terminal devices are different. In addition, the users share a parameter of a module other than the scaled dot-product attention module in the scheduling model, so that when the scheduling model is expandable and applicable to scenarios in which quantities of to-be-scheduled terminal devices are different, the neural network does not need to be retrained.

Figure 14:
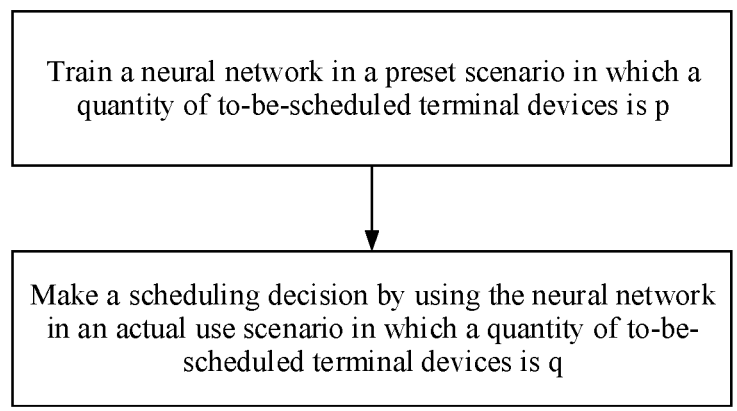
FIG. 14 is a schematic diagram of training and using a neural network according to an embodiment of this application.

It should be noted that, for the neural network in any embodiment of this application, sample data may be used to pre-train the neural network in a preset scenario, and the sample data may be a to-be-scheduled terminal device in the preset scenario. When making a scheduling decision, the network device may use a trained neural network, as shown in FIG. 14. For example, a quantity of to-be-scheduled terminal devices in the preset scenario may be different from a quantity of to-be-scheduled terminal devices in an actual use scenario.

Alternatively, an online training method may be used for the neural network in any embodiment of this application. For example, after making the scheduling decision by using the neural network, the network device determines a gain of a decision result, adjusts a parameter of the neural network based on the gain, interacts with an environment in an iterative manner, and continuously adjusts the parameter of the neural network to obtain a greater gain. After convergence, a better scheduling policy may be obtained.

To implement functions in the method provided in embodiments of this application, the network device may include a hardware structure and/or a software module, and implement the functions in a form of the hardware structure, the software module, or a combination of the hardware structure and the software module. Whether a function in the foregoing functions is performed in a form of the hardware structure, the software module, or both the hardware structure and the software module depends on a specific application and a design constraint condition of the technical solutions.

Figure 15:
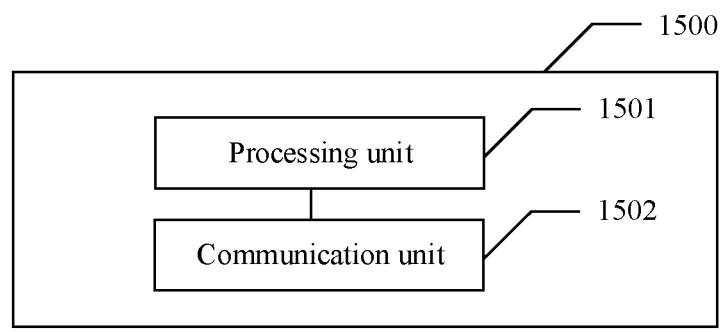
FIG. 15 is a schematic diagram of a structure of a scheduling apparatus according to an embodiment of this application.

As shown in FIG. 15, an embodiment of this application further provides a scheduling apparatus 1500 based on a same technical concept. The apparatus 1500 may be a network device, an apparatus (for example, a chip, a chip system, a chip group, or a part, in a chip, that is configured to perform a related method function) in a network device, or an apparatus that can match a network device for use. In a design, the apparatus 1500 may include a module corresponding to the method/operation/step/action performed by the network device in the foregoing method embodiments. The module may be a hardware circuit or software, or may be implemented by a hardware circuit in combination with software. In a design, the apparatus may include a processing unit 1501 and a communication unit 1502.

In an implementation, the scheduling apparatus may specifically be configured to implement the method performed by the network device in the embodiment in FIG. 5. The communication unit 1502 is configured to input status information of n to-be-scheduled terminal devices to the processing unit 1501. The processing unit 1501 is configured to: use a scheduling model for M times, where each time the scheduling model is used, status information of K terminal devices in the n to-be-scheduled terminal devices is input to the scheduling model, the scheduling model outputs scheduling weights respectively corresponding to the K terminal devices, the scheduling model is a neural network model obtained based on the quantity K of terminal devices that is input each time, M is an integer greater than or equal to 1, K is an integer greater than 1, and n is an integer greater than K; and determine a decision result based on M outputs of the scheduling model, where the decision result indicates a scheduled terminal device. The communication unit 1502 is further configured to output the decision result.

For example, the processing unit 1501 may include a decision module, where the decision module is configured to determine the scheduled terminal device based on the scheduling weight of the terminal device. When determining the decision result based on M outputs of the scheduling model, the processing unit 1501 is specifically configured to: use the decision module for M times, where when the decision module is used for an $i^{th}$ time, a scheduling weight that is output when the scheduling model is used for an $i^{th}$ time is input to the decision module, the decision module outputs a scheduled terminal device in the K terminal devices that is input when the scheduling model is used for the $i^{th}$ time, i={1, 2, 3, . . . , M}, and the decision module is configured to determine the scheduled terminal device based on the scheduling weight of the terminal device; determine L to-be-scheduled terminal devices based on the scheduled terminal device in the K terminal devices that is input each time the scheduling model is used, where L is a positive integer; if L is less than or equal to K, input status information of the L to-be-scheduled terminal devices to the scheduling model, to obtain scheduling weights respectively corresponding to the L to-be-scheduled terminal devices; and input the scheduling weights corresponding to the L to-be-scheduled terminal devices to the decision module, to obtain the decision result.

For example, when the status information of the K terminal devices in the n to-be-scheduled terminal devices is input to the scheduling model, and the scheduling model outputs the scheduling weights respectively corresponding to the K terminal devices, the processing unit 1501 is specifically configured to: input the status information of the K terminal devices in the n to-be-scheduled terminal devices to an input layer of the scheduling model for dimension conversion; input the status information of the K terminal devices on which dimension conversion is performed to a hidden layer of the scheduling model for feature extraction, where the scheduling model includes one or more hidden layers; and input a feature extracted by the hidden layer to an output layer of the scheduling model, to obtain the scheduling weights respectively corresponding to the K terminal devices.

For example, a size of the input layer is K×M, and M is a quantity of performance parameters included in the status information.

For example, a quantity of neurons at an $l^{th}$ hidden layer of the scheduling model is K×M×$a_l$, M is the quantity of performance parameters included in the status information, and $a_l$ is a positive integer.

For example, K is a possible minimum quantity of active users in a network.

For example, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

In another implementation, the scheduling apparatus may specifically be configured to implement the method performed by the network device in the embodiment in FIG. 7. The communication unit 1502 is configured to input status information of n to-be-scheduled terminal devices to the processing unit 1501. The processing unit 1501 is configured to: select K to-be-scheduled terminal devices from the n to-be-scheduled terminal devices, where K is an integer greater than 1, and n is an integer greater than or equal to K; input status information of the K to-be-scheduled terminal devices to a scheduling model, to obtain scheduling weights respectively corresponding to the K to-be-scheduled terminal devices, where the scheduling model is a neural network model obtained based on the quantity K of selected terminal devices; and determine a decision result based on the scheduling weights respectively corresponding to the K to-be-scheduled terminal devices, where the decision result indicates a scheduled terminal device. The communication unit 1502 is further configured to output the decision result.

For example, when the K to-be-scheduled terminal devices are selected from the n to-be-scheduled terminal devices, the processing unit 1501 is specifically configured to: sort then to-be-scheduled terminal devices based on at least one performance parameter in the status information; and determine the K to-be-scheduled terminal devices based on the sorted n to-be-scheduled terminal devices.

For example, when inputting the status information of the K to-be-scheduled terminal devices to the scheduling model, the processing unit 1501 is specifically configured to input the status information of the K to-be-scheduled terminal devices to an input layer of the scheduling model for dimension conversion; input the status information of the K to-be-scheduled terminal devices on which dimension conversion is performed to a hidden layer of the scheduling model for feature extraction, where the scheduling model includes one or more hidden layers; and input a feature extracted by the hidden layer to an output layer of the scheduling model, to obtain the scheduling weights respectively corresponding to the K to-be-scheduled terminal devices.

For example, a size of the input layer is K×M, and M is a quantity of performance parameters included in the status information.

For example, a quantity of neurons at an $l^{th}$ hidden layer of the scheduling model is K×M×$a_l$, M is the quantity of performance parameters included in the status information, and $a_l$ is a positive integer.

For example, K is a possible minimum quantity of active users in a network.

For example, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

In another implementation, the scheduling apparatus may specifically be configured to implement the method performed by the network device in the embodiment in FIG. 8. The communication unit 1502 is configured to input status information of n to-be-scheduled terminal devices to the processing unit 1501. The processing unit 1501 is configured to: input the status information of the n to-be-scheduled terminal devices to a first module of a scheduling model for association, to obtain first data respectively corresponding to the n to-be-scheduled terminal devices, where the first data is data obtained after the status information of the terminal devices corresponding to the first data is associated with status information of another terminal device, and n is an integer greater than or equal to 1; use a second module for n times, where each time the second module is used, first data corresponding to one of the n to-be-scheduled terminal devices is input to the second module, the second module outputs a scheduling weight of the terminal device, and the second module is configured to determine the scheduling weight; and determine a decision result based on scheduling weights of the n to-be-scheduled terminal devices, where the decision result indicates a scheduled terminal device. The communication unit 1502 is further configured to output the decision result. For example, the scheduling model further includes a third module, and the third module is configured to perform feature extraction.

For example, before inputting the status information of the n to-be-scheduled terminal devices to the first module of the scheduling model for association, the processing unit 1501 is further configured to use the third module for n times, where each time the third module is used, status information of one of the n to-be-scheduled terminal devices is input to the third module, and the third module outputs second data of the terminal device.

When inputting the status information of the n to-be-scheduled terminal devices to the first module of the scheduling model for association, the processing unit 1501 may specifically be configured to input second data of the n to-be-scheduled terminal devices to the first module for association.

For example, the scheduling model further includes a fourth module, and the fourth module is configured to perform dimension increasing.

For example, before using the third module for n times, the processing unit 1501 is further configured to use the fourth module for n times, where each time the fourth module is used, status information of one of the n to-be-scheduled terminal devices is input to the fourth module, and the fourth module outputs status information of the terminal device obtained through dimension increasing.

When inputting the status information of one of the n to-be-scheduled terminal devices to the third module, the processing unit 1501 may specifically be configured to input status information of one of the n to-be-scheduled terminal devices obtained through dimension increasing to the third module.

For example, the status information includes at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

The processing unit 1501 and the communication unit 1502 may further be configured to perform other corresponding steps or operations performed by the network device in the foregoing method embodiments. Details are not described herein again.

Division into modules in embodiments of this application is an example, is merely logical function division, and may be another division manner during actual implementation. In addition, functional modules in embodiments of this application may be integrated into one processor, or may exist alone physically, or two or more modules are integrated into one module. The integrated module may be implemented in a form of hardware, or may be implemented in a form of a software functional module.

Figure 16:
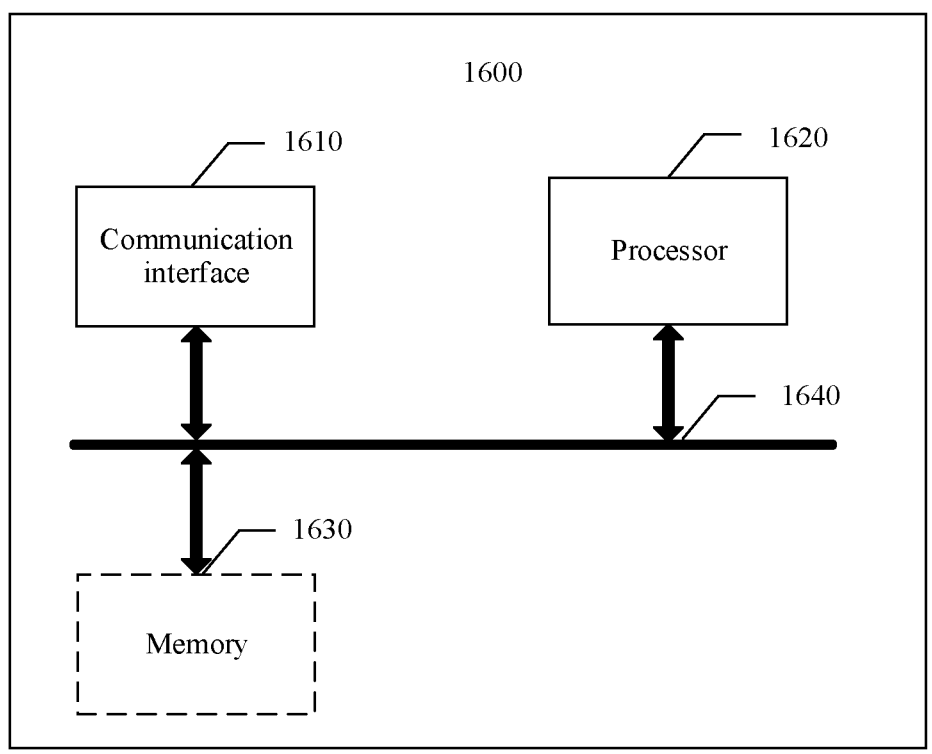
FIG. 16 is a schematic diagram of a structure of another scheduling apparatus according to an embodiment of this application.

FIG. 16 shows an apparatus 1600 according to an embodiment of this application, to implement a function of the scheduling apparatus 1500 in the foregoing method. The apparatus may be a network device, an apparatus (for example, a chip, a chip system, a chip group, or a part, in a chip, that is configured to perform a related method function) in a network device, or an apparatus that can match a network device for use. The apparatus may be a chip system. In embodiments of this application, the chip system may include a chip, or may include a chip and another discrete component. The apparatus 1600 includes at least one processor 1620, configured to implement the function of the network device in the method provided in embodiments of this application. The apparatus 1600 may further include a communication interface 1610. In embodiments of this application, the communication interface 1610 may be a transceiver, a circuit, a bus, a module, or another type of communication interface, and is configured to communicate with another device by using a transmission medium. The processor 1620 receives and sends data through the communication interface 1610, and is configured to implement the method performed by the network device in the method embodiments. The processor 1620 is configured to use a scheduling model for M times and the like. The processor 1620 and the communication interface 1610 may further be configured to perform other corresponding steps or operations performed by the network device in the foregoing method embodiments. Details are not described herein again.

The apparatus 1600 may further include at least one memory 1630, configured to store program instructions and/or data. The memory 1630 is coupled to the processor 1620. Coupling in embodiments of this application is indirect coupling or a communication connection between apparatuses, units, or modules, and may be in an electrical, mechanical, or another form, and is used for information exchange between the apparatuses, units, or modules. The processor 1620 may cooperate with the memory 1630. The processor 1620 may execute the program instructions stored in the memory 1630. At least one of the at least one memory may be included in the processor.

A specific connection medium between the communication interface 1610, the processor 1620, and the memory 1630 is not limited in embodiments of this application. In embodiments of this application, in FIG. 16, the memory 1630, the processor 1620, and the communication interface 1610 are connected through a bus 1640. The bus is represented by a thick line in FIG. 16. A connection manner between other components is merely described as an example, and is not limited thereto. The bus may be classified into an address bus, a data bus, a control bus, and the like. For ease of representation, only one thick line is used to represent the bus in FIG. 16, but this does not mean that there is only one bus or only one type of bus.

In an embodiment, when the apparatus 1500 and the apparatus 1600 are specifically chips or chip systems, information output or received by the communication module 1501 and the communication interface 1610 may be in a form of a baseband signal. For example, when the apparatus 1500 and the apparatus 1600 implement functions of the network device, the communication interface 1610 receives a baseband signal that carries information.

In an embodiment, when the apparatus 1500 and the apparatus 1600 are specifically devices, the communication interface 1610 may output or receive a radio frequency signal. For example, when the apparatus 1500 and the apparatus 1600 implement functions of the network device, the communication interface 1610 receives a radio frequency signal that carries information.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly executed and accomplished by a hardware processor, or may be executed and accomplished by using a combination of hardware and software modules in the processor.

In embodiments of this application, the memory may be a non-volatile memory, a hard disk drive (hard disk drive, HDD) or a solid-state drive (solid-state drive, SSD), or may be a volatile memory (volatile memory), for example, a random access memory (random access memory, RAM). The memory is any other medium that can be used to carry or store expected program code in a form of an instruction or a data structure and that can be accessed by a computer. However, this is not limited thereto. The memory in embodiments of this application may alternatively be a circuit or any other apparatus that can implement a storage function, and is configured to store program instructions and/or data.

Figure 17:
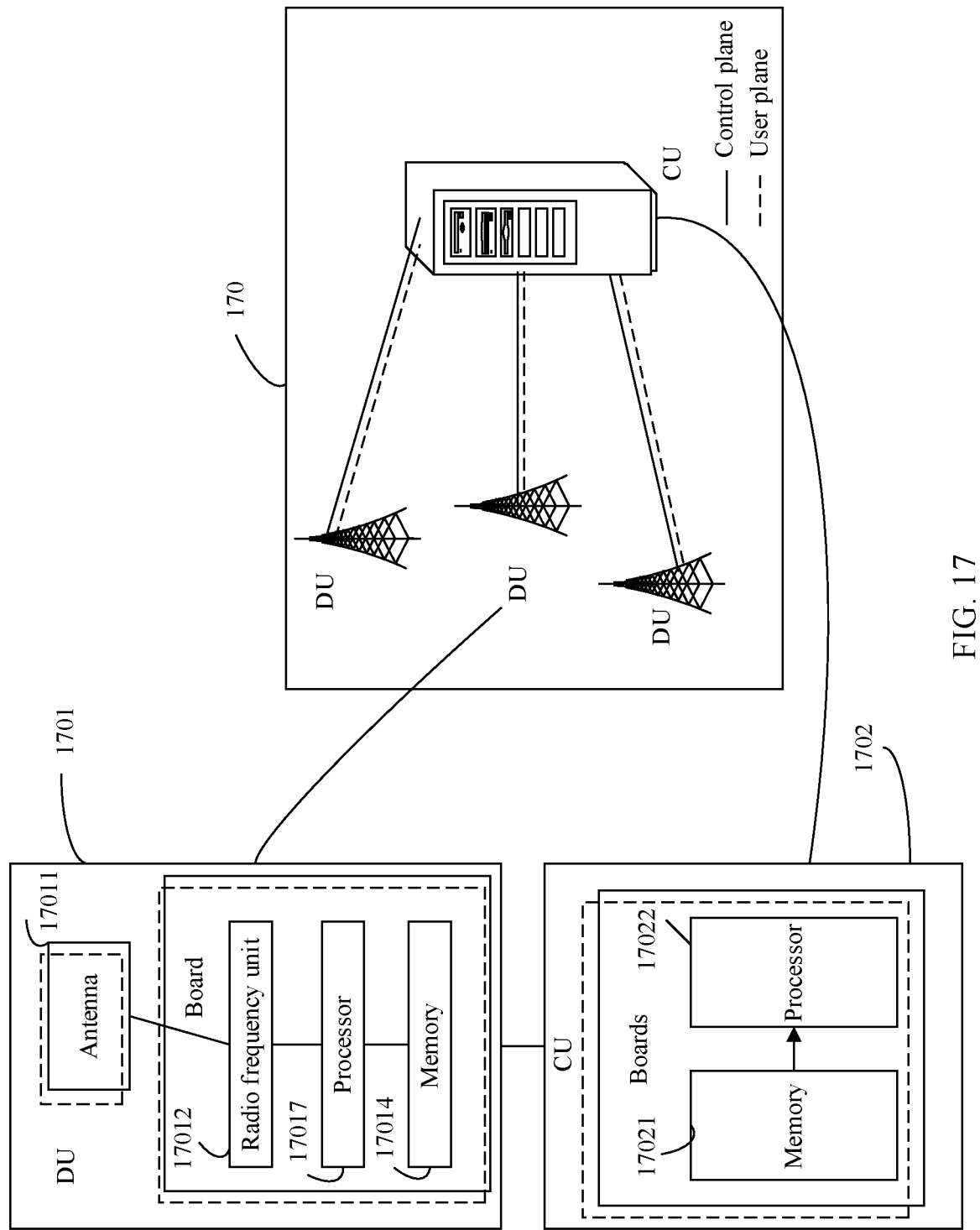
FIG. 17 is a schematic diagram of a structure of a network device according to an embodiment of this application.

FIG. 17 is a schematic diagram of a structure of a network device according to an embodiment of this application, for example, a schematic diagram of a structure of a base station. As shown in FIG. 17, the network device may be applied to the system shown in FIG. 1, and performs functions of the network device in the method embodiments in FIG. 5 to FIG. 14. A base station 170 may include one or more distributed units (distributed unit, DU) 1701 and one or more centralized units (centralized unit, CU) 1702. The DU 1701 may include at least one antenna 17011, at least one radio frequency unit 17012, at least one processor 17017, and at least one memory 17014. The DU 1701 part is mainly configured to: send and receive a radio frequency signal, perform conversion between a radio frequency signal and a baseband signal, and perform partial baseband processing. The CU 1702 may include at least one processor 17022 and at least one memory 17021. The CU 1702 may communicate with the DU 1701 through an interface. A control plane (Control plane) interface may be Fs-C, for example, F1-C, and a user plane (User Plane) interface may be Fs-U, for example, F1-U.

The CU 1702 is mainly configured to: perform baseband processing, control a base station, and the like. The DU 1701 and the CU 1702 may be physically disposed together, or may be physically separated, that is, in a distributed base station. The CU 1702 is a control center of the base station, may also be referred to as a processing unit, and is mainly configured to implement a baseband processing function. For example, the CU 1702 may be configured to control the base station to execute an operation procedure related to the network device in the foregoing method embodiment in FIG. 5 to FIG. 14.

Specifically, baseband processing of the CU and the DU may be divided based on a protocol layer of a wireless network. For example, functions of a PDCP layer and a layer above the PDCP layer are set on the CU, and functions of protocol layers below the PDCP layer, such as an RLC layer and a MAC layer, are set on the DU. For another example, the CU implements functions of the RRC layer and the PDCP layer, and the DU implements functions of the RLC layer, the MAC layer, and the physical (physical, PHY) layer.

In addition, optionally, the base station 170 may include one or more radio frequency units (RU), one or more DUs, and one or more CUs. The DU may include at least one processor 17017 and at least one memory 17014, the RU may include at least one antenna 17011 and at least one radio frequency unit 17012, and the CU may include at least one processor 17022 and at least one memory 17021.

In an embodiment, the CU 1702 may include one or more boards. A plurality of boards may jointly support a radio access network (for example, a 5G network) of a single access standard, or may respectively support radio access networks of different access standards (such as an LTE network, a 5G network, or another network). The memory 17021 and the processor 17022 may serve one or more boards. In other words, a memory and a processor may be disposed on each board. Alternatively, a plurality of boards may share a same memory and a same processor. In addition, a necessary circuit may further be disposed on each board. The DU 1701 may include one or more boards. A plurality of boards may jointly support a radio access network (for example, a 5G network) of a single access standard, or may respectively support radio access networks of different access standards (such as an LTE network, a 5G network, or another network). The memory 17014 and the processor 17017 may serve one or more boards. In other words, a memory and a processor may be disposed on each board. Alternatively, a plurality of boards may share a same memory and a same processor. In addition, a necessary circuit may further be disposed on each board.

An embodiment of this application further provides a computer-readable storage medium. The computer-readable storage medium stores a computer program. When the computer program is executed by a communication apparatus, the communication apparatus performs the scheduling method. For example, the computer-readable storage medium may be any available medium accessible by a computer. By way of example, and not limitation, the computer-readable medium may include a non-transient computer-readable medium, a RAM, a ROM, an EEPROM, a CD-ROM or other optical disk storage, a disk storage medium or another disk storage device, or any other medium that can carry or store expected program code in a form of an instruction structure or a data structure and that can be accessed by a computer. An embodiment of this application further provides a computer program product. When the computer program product is executed by a communication apparatus, the communication apparatus performs the scheduling method. For example, the computer program product may be a computer program product including a non-transitory computer-readable medium.

A person skilled in the art should understand that embodiments of this application may be provided as a method, a system, or a computer program product. Therefore, this application may use a form of a hardware-only embodiment, a software-only embodiment, or an embodiment in combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover the modifications and variations of this application, provided that they fall within the scope of the following claims and equivalent technologies of this application.

What is claimed is:

1. A scheduling method implemented by a communication apparatus, comprising:
    using a scheduling model for M times, wherein each time the scheduling model is used, status information of K terminal devices in n to-be-scheduled terminal devices is input to the scheduling model, the scheduling model outputs scheduling weights respectively corresponding to the K terminal devices, the scheduling model is a neural network model obtained based on the quantity K of terminal devices that is input each time, M is an integer greater than or equal to 1, K is an integer greater than 1, and n is an integer greater than K; and
    determining a decision result based on the scheduling weights output by the scheduling model for M times, wherein the decision result indicates a scheduled terminal device.

2. The method according to claim 1, wherein the determining the decision result based on the scheduling weights output by the scheduling model for M times comprises:
    using a decision module for M times, wherein when the decision module is used for an $i^{th}$ time, a scheduling weight that is output when the scheduling model is used for an $i^{th}$ time is input to the decision module, the decision module outputs a scheduled terminal device in the K terminal devices that is input when the scheduling model is used for the $i^{th}$ time, i={1, 2, 3, . . . , M}, and the decision module is configured to determine the scheduled terminal device based on the scheduling weight of the terminal device;
    determining L to-be-scheduled terminal devices based on the scheduled terminal device in the K terminal devices that is input each time the scheduling model is used, wherein L is a positive integer;
    when L is less than or equal to K, inputting status information of the L to-be-scheduled terminal devices to the scheduling model, to obtain scheduling weights respectively corresponding to the L to-be-scheduled terminal devices; and
    inputting the scheduling weights corresponding to the L to-be-scheduled terminal devices to the decision module, to obtain the decision result.

3. The method according to claim 1, wherein that status information of K terminal devices in n to-be-scheduled terminal devices is input to the scheduling model, and the scheduling model outputs scheduling weights respectively corresponding to the K terminal devices comprises:
    inputting the status information of the K terminal devices in the n to-be-scheduled terminal devices to an input layer of the scheduling model for dimension conversion;
    inputting the status information of the K terminal devices on which dimension conversion is performed to a hidden layer of the scheduling model for feature extraction, wherein the scheduling model comprises one or more hidden layers; and
    inputting a feature extracted by the hidden layer to an output layer of the scheduling model, to obtain the scheduling weights respectively corresponding to the K terminal devices.

4. The method according to claim 3, wherein a size of the input layer is K×M, and M is a quantity of performance parameters comprised in the status information.

5. The method according to claim 3, wherein a quantity of neurons at an $l^{th}$ hidden layer of the scheduling model is K×M×$a_l$, M is the quantity of performance parameters comprised in the status information, and $a_l$ is a positive integer.

6. The method according to claim 1, wherein K is a possible minimum quantity of active users in a network.

7. The method according to claim 1 wherein the status information comprises at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

8. A scheduling method implemented by a communication apparatus, comprising:
    selecting K to-be-scheduled terminal devices from n to-be-scheduled terminal devices, wherein K is an integer greater than 1, and n is an integer greater than or equal to K;
    inputting status information of the K to-be-scheduled terminal devices to a scheduling model, to obtain scheduling weights respectively corresponding to the K to-be-scheduled terminal devices, wherein the scheduling model is a neural network model obtained based on the quantity K of selected terminal devices; and
    determining a decision result based on the scheduling weights respectively corresponding to the K to-be-scheduled terminal devices, wherein the decision result indicates a scheduled terminal device.

9. The method according to claim 8, wherein the selecting K to-be-scheduled terminal devices from n to-be-scheduled terminal devices comprises:
    sorting the n to-be-scheduled terminal devices based on at least one performance parameter in the status information; and
    determining the K to-be-scheduled terminal devices based on the sorted n to-be-scheduled terminal devices.

10. The method according to claim 8, wherein the inputting status information of the K to-be-scheduled terminal devices to a scheduling model comprises:
　　inputting the status information of the K to-be-scheduled terminal devices to an input layer of the scheduling model for dimension conversion;
　　inputting the status information of the K to-be-scheduled terminal devices on which dimension conversion is performed to a hidden layer of the scheduling model for feature extraction, wherein the scheduling model comprises one or more hidden layers; and
　　inputting a feature extracted by the hidden layer to an output layer of the scheduling model, to obtain the scheduling weights respectively corresponding to the K to-be-scheduled terminal devices.

11. A scheduling method implemented by a communication apparatus, comprising:
　　inputting status information of n to-be-scheduled terminal devices to a first module of a scheduling model for association, to obtain first data respectively corresponding to the n to-be-scheduled terminal devices, wherein the first data is data obtained after the status information of the terminal devices corresponding to the first data is associated with status information of another terminal device, and n is an integer greater than or equal to 1;
　　using a second module of the scheduling model for n times, wherein each time the second module is used, first data corresponding to one of the n to-be-scheduled terminal devices is input to the second module, the second module outputs a scheduling weight of the terminal device, and the second module is configured to determine the scheduling weight; and
　　determining a decision result based on scheduling weights of the n to-be-scheduled terminal devices, wherein the decision result indicates a scheduled terminal device.

12. The method according to claim 11, wherein the scheduling model further comprises a third module, and the third module is configured to perform feature extraction;
　　before the inputting status information of n to-be-scheduled terminal devices to a first module of the scheduling model for association, the method further comprises:
　　using the third module for n times, wherein each time the third module is used, status information of one of the n to-be-scheduled terminal devices is input to the third module, and the third module outputs second data of the terminal device; and
　　the inputting status information of n to-be-scheduled terminal devices to a first module of a scheduling model for association comprises:
　　inputting second data of the n to-be-scheduled terminal devices to the first module for association.

13. The method according to claim 12, wherein the scheduling model further comprises a fourth module, and the fourth module is configured to perform dimension increasing;
　　before the using the third module for n times, the method further comprises:
　　using the fourth module for n times, wherein each time the fourth module is used, status information of one of the n to-be-scheduled terminal devices is input to the fourth module, and the fourth module outputs status information of the terminal device obtained through dimension increasing; and
　　that status information of one of the n to-be-scheduled terminal devices is input to the third module comprises:
　　inputting status information of one of the n to-be-scheduled terminal devices obtained through dimension increasing to the third module.

14. The method according to claim 11, wherein the status information comprises at least one of the following performance parameters: an estimated throughput of the terminal device, an average throughput of the terminal device, a cache queue length of the terminal device, a packet delay of the terminal device, an identifier of the terminal device, a packet loss rate of the terminal device, channel quality, and a historical throughput of the terminal device.

15. A communication apparatus, wherein the apparatus is used on a base station, and the communications apparatus comprises a processor and a transceiver operatively connected to the processor, wherein the processor is configured to perform operations comprising:
　　inputting status information of n to-be-scheduled terminal devices to the processor;
　　using a scheduling model for M times, wherein each time the scheduling model is used, status information of K terminal devices in the n to-be-scheduled terminal devices is input to the scheduling model, the scheduling model outputs scheduling weights respectively corresponding to the K terminal devices, the scheduling model is a neural network model obtained based on the quantity K of terminal devices that is input each time, M is an integer greater than or equal to 1, K is an integer greater than 1, and n is an integer greater than K; and
　　determine a decision result based on the scheduling weights output by the scheduling model for M times, wherein the decision result indicates a scheduled terminal device; and
　　outputting the decision result.

16. The apparatus according to claim 15, wherein the processor stores a decision module determining a scheduled terminal device based on the scheduling weight of the terminal device; and
　　when determining the decision result based on the scheduling weights output by the scheduling model for M times, the processor is configured to perform operations comprising:
　　using the decision module for M times, wherein when the decision module is used for an $i^{th}$ time, a scheduling weight that is output when the scheduling model is used for an $i^{th}$ time is input to the decision module, the decision module outputs a scheduled terminal device in the K terminal devices that is input when the scheduling model is used for the $i^{th}$ time, and i={1, 2, 3, ..., M};
　　determining L to-be-scheduled terminal devices based on the scheduled terminal device in the K terminal devices that is input each time the scheduling model is used, wherein L is a positive integer;
　　if L is less than or equal to K, inputting status information of the L to-be-scheduled terminal devices to the scheduling model, to obtain scheduling weights respectively corresponding to the L to-be-scheduled terminal devices; and
　　inputting the scheduling weights corresponding to the L to-be-scheduled terminal devices to the decision module, to obtain the decision result.

17. The apparatus according to claim 15, wherein when the status information of the K terminal devices in the n to-be-scheduled terminal devices is input to the scheduling model, and the scheduling model outputs the scheduling weights respectively corresponding to the K terminal devices, the processor is configured to perform operations comprising:
- inputting the status information of the K terminal devices in the n to-be-scheduled terminal devices to an input layer of the scheduling model for dimension conversion;
- inputting the status information of the K terminal devices on which dimension conversion is performed to a hidden layer of the scheduling model for feature extraction, wherein the scheduling model comprises one or more hidden layers; and
- inputting a feature extracted by the hidden layer to an output layer of the scheduling model, to obtain the scheduling weights respectively corresponding to the K terminal devices.

* * * * *